(12) United States Patent
Hayashi

(10) Patent No.: US 10,871,929 B2
(45) Date of Patent: Dec. 22, 2020

(54) INFORMATION PROCESSING APPARATUS THAT DETERMINES AN IMAGE FORMING APPARATUS TO BE USED FOR A PRINTING JOB BASED ON A NUMBER OF SHEETS TO BE USED IN THE PRINTING JOB, AND RELATED IMAGE FORMING APPARATUS DETERMINATION METHOD AND STORAGE MEDIUM

(71) Applicant: CANON KABUSHIKI KAISHA, Tokyo (JP)

(72) Inventor: Kimio Hayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/128,975

(22) Filed: Sep. 12, 2018

(65) Prior Publication Data

US 2019/0095154 A1    Mar. 28, 2019

(30) Foreign Application Priority Data

Sep. 25, 2017 (JP) ................................ 2017-183833

(51) Int. Cl.
*G06F 3/12* (2006.01)
*G06K 15/02* (2006.01)

(52) U.S. Cl.
CPC .......... *G06F 3/1253* (2013.01); *G06F 3/1204* (2013.01); *G06F 3/1226* (2013.01); *G06F 3/1232* (2013.01); *G06F 3/1282* (2013.01); *G06F 3/1285* (2013.01); *G06F 3/1288* (2013.01)

(58) Field of Classification Search
None
See application file for complete search history.

(56) References Cited

U.S. PATENT DOCUMENTS

| 5,913,093 | A  | * | 6/1999 | Yamanaka | G03G 15/6538 |
|---|---|---|---|---|---|
| | | | | | 399/397 |
| 7,372,589 | B2 | | 5/2008 | Ohara | |
| 9,292,232 | B2 | * | 3/2016 | Toriumi | G06F 3/1204 |
| 10,387,082 | B2 | * | 8/2019 | Soriano | G03G 15/6508 |
| 2001/0053304 | A1 | * | 12/2001 | Noda | G06F 3/1204 |
| | | | | | 400/578 |

(Continued)

FOREIGN PATENT DOCUMENTS

JP    2003-167709 A    6/2003

*Primary Examiner* — Beniyam Menberu
(74) *Attorney, Agent, or Firm* — Venable LLP

(57) ABSTRACT

An information processing apparatus includes a processor that acquires a state of a paper feeding stage from an image forming apparatus of interest, and determines, based on the state of the paper feeding stage, whether or not the image forming apparatus of interest has a number of sheets that are to be consumed for a printing job of interest. The processor also determines that the image forming apparatus determined to have the number of sheets, is a transmission destination of the printing job of interest. If one of paper feeding stages of the image forming apparatus of interest has the number of sheets to be consumed for the printing job of interest, the processor sets the printing job of interest so as to preferentially supply sheets from the paper feeding stage determined to have the number of sheets.

12 Claims, 16 Drawing Sheets

(56) References Cited

U.S. PATENT DOCUMENTS

| | | | |
|---|---|---|---|
| 2006/0038844 A1* | 2/2006 | Kiwada | B41J 11/009 347/16 |
| 2008/0013109 A1* | 1/2008 | Chen | G06K 15/02 358/1.1 |
| 2008/0063424 A1* | 3/2008 | Tanaka | G03G 15/70 399/79 |
| 2009/0261524 A1* | 10/2009 | Nakayama | B65H 7/04 271/3.14 |
| 2012/0224220 A1* | 9/2012 | Toriumi | G06F 3/1204 358/1.15 |
| 2013/0107317 A1* | 5/2013 | Yamauchi | B41J 11/485 358/1.15 |
| 2014/0140749 A1* | 5/2014 | Harano | B41J 11/485 400/582 |
| 2015/0254541 A1* | 9/2015 | Yoshida | B65H 7/20 358/1.15 |
| 2017/0088378 A1* | 3/2017 | Sone | B65H 3/44 |
| 2017/0277986 A1* | 9/2017 | Hanamura | G06K 15/4065 |

* cited by examiner

FIG. 7A

```
<?xml version="1.0" encoding="UTF 8" ?>
<JMF SenderID="JMFClient" TimeStamp="2016 01 01T00:00:00Z"
    xmlns="http://www.CIP4.org/JDFSchema_1_1"
    xmlns:xsi="http://www.w3.org/2001/XMLSchema instance" Version="1.3">
  <Query ID="Q0001" Type="Resource" xsi:type="QueryResource">
    <ResourceQuParams ResourceName="Media" Scope="Present" />
  < Query>
< JMF>
```
— 700
— 701

FIG. 7B

```
<?xml version="1.0" encoding="utf 8"?>
<JMF xmlns="http://www.CIP4.org/JDFSchema_1_1" MaxVersion="1.5" Version="1.5">
  <Response ID="R0001" ReturnCode="0" Type="Resource" refID="Q0001" xsi:type="ResponseResource">
    <ResourceInfo Level="OK" DescriptiveName="A4 Coated" ResourceName="Media" ResourceID="ID_A4Coated">
      <Media Class="Consumable" DescriptiveName="A4 coated" Dimension="595 841"
        FrontCoatings="Coated" ID="ID_A4Coated" MediaType="Paper" MediaUnit="Sheet"
        Status="Available" Weight="100">
        <GeneralID DataType="string" IDUsage="DeviceProductID" IDValue="Media1"/>
      < Media>
      <AmountPool>
        <PartAmount DescriptiveName="A4 Coated SEF" Orientation="Rotate0" ActualAmount="300" >
          <Part Location="Tray 1" />
        < PartAmount>
        <PartAmount DescriptiveName="A4 Coated SEF" Orientation="Rotate0" ActualAmount="10" >
          <Part Location="Tray 2" />
        < PartAmount>
        <PartAmount DescriptiveName="A4 Coated SEF" Orientation="Rotate0" ActualAmount="200" >
          <Part Location="Tray 3" />
        < PartAmount>
        <PartAmount DescriptiveName="A4 Coated SEF" Orientation="Rotate0" ActualAmount="100" >
          <Part Location="Tray 4" />
        < PartAmount>
      < AmountPool>
    < ResourceInfo>
  < Response>
< JMF>
```
— 702
703
708
704
709
705
710
706
711
707

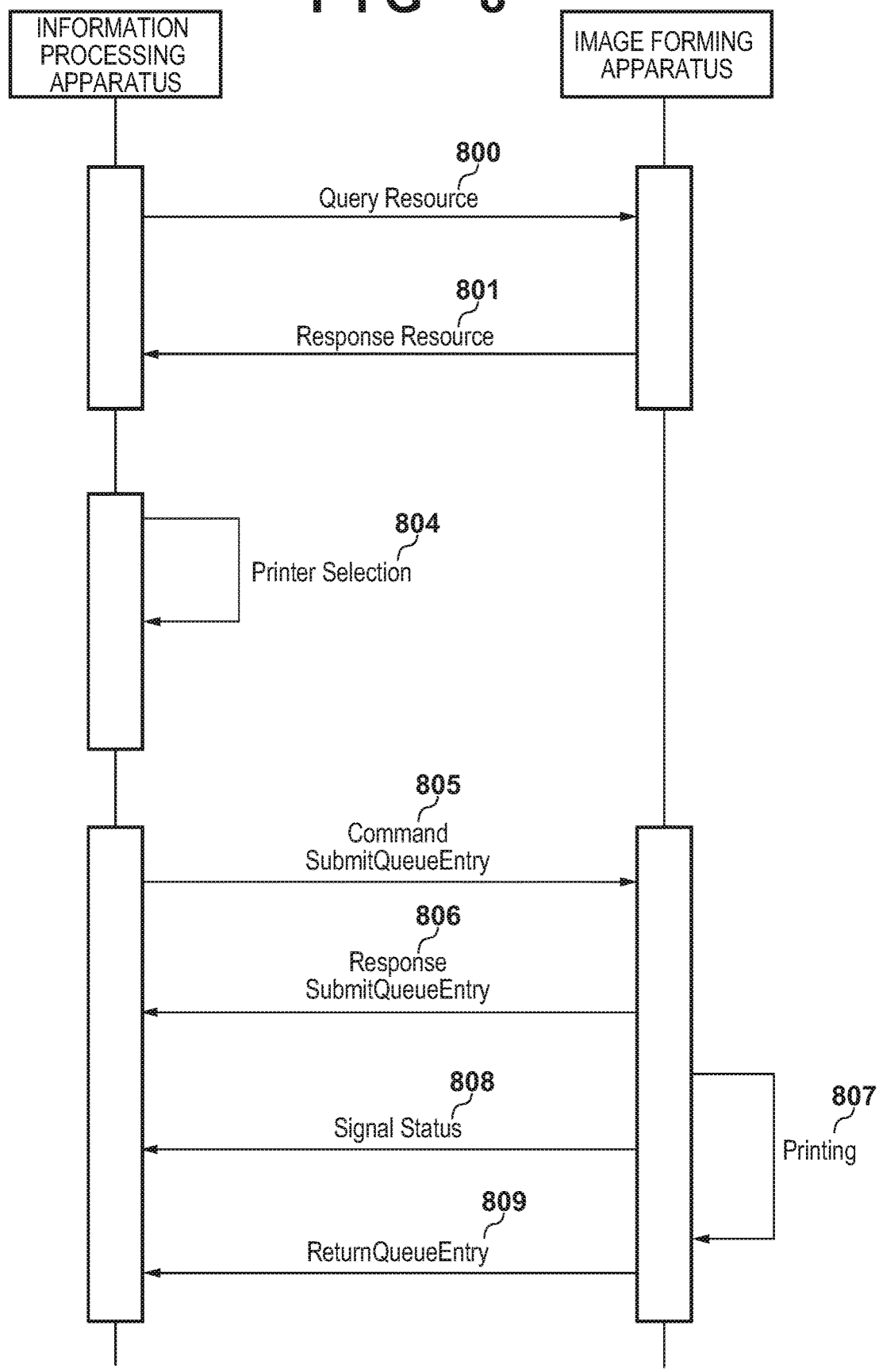

FIG. 9A

■ PRINTING JOB 900

| THIRD JOB | SECOND JOB | FIRST JOB |
|---|---|---|
| SIZE : A4<br>ORIENTATION: Portrait<br>GRAMMAGE: 100gsm<br>USED AMOUNT : 300sheets | SIZE : A4<br>ORIENTATION: Portrait<br>GRAMMAGE: 100gsm<br>USED AMOUNT : 300sheets | SIZE : A4<br>ORIENTATION: Portrait<br>GRAMMAGE: 100gsm<br>USED AMOUNT : 300sheets |
| IMAGE FORMING APPARATUSES 102<br>CASSETTE 2 | IMAGE FORMING APPARATUSES 102<br>CASSETTE 2 | IMAGE FORMING APPARATUSES 102<br>CASSETTE 2  905  901 |
| SIZE : A4<br>ORIENTATION: Landscape<br>GRAMMAGE: 100gsm<br>USED AMOUNT : 300sheets | SIZE : A4<br>ORIENTATION: Portrait<br>GRAMMAGE: 120gsm<br>USED AMOUNT : 500sheets | SIZE : A4<br>ORIENTATION: Landscape<br>GRAMMAGE: 100gsm<br>USED AMOUNT : 300sheets |
| IMAGE FORMING APPARATUSES 103<br>CASSETTE 1 | IMAGE FORMING APPARATUSES 104<br>CASSETTE 1 | IMAGE FORMING APPARATUSES 103<br>AUTOMATIC SWITCH  906  902 |
| SIZE : A4<br>ORIENTATION: Landscape<br>GRAMMAGE: 100gsm<br>USED AMOUNT : 300sheets | SIZE : A4<br>ORIENTATION: Landscape<br>GRAMMAGE: 100gsm<br>USED AMOUNT : 500sheets | SIZE : A4<br>ORIENTATION: Portrait<br>GRAMMAGE: 120gsm<br>USED AMOUNT : 130sheets |
| IMAGE FORMING APPARATUSES 104<br>CASSETTE 1 | IMAGE FORMING APPARATUSES 104<br>CASSETTE 1 | IMAGE FORMING APPARATUSES 104<br>CASSETTE 4  907  903 |
| SIZE : A3<br>ORIENTATION: Landscape<br>GRAMMAGE: 150gsm<br>USED AMOUNT : 50sheets | SIZE : A4<br>ORIENTATION: Portrait<br>GRAMMAGE: 120gsm<br>USED AMOUNT : 500sheets | SIZE : A4<br>ORIENTATION: Landscape<br>GRAMMAGE: 100gsm<br>USED AMOUNT : 300sheets |
| IMAGE FORMING APPARATUSES 104<br>CASSETTE 3 | IMAGE FORMING APPARATUSES 104<br>CASSETTE 1 | IMAGE FORMING APPARATUSES 103<br>AUTOMATIC SWITCH  908  904 |
| SIZE : A3<br>ORIENTATION: Landscape<br>GRAMMAGE: 150gsm<br>USED AMOUNT : 50sheets | SIZE : A4<br>ORIENTATION: Landscape<br>GRAMMAGE: 100gsm<br>USED AMOUNT : 500sheets | SIZE : A4<br>ORIENTATION: Landscape<br>GRAMMAGE: 100gsm<br>USED AMOUNT : 300sheets |
| IMAGE FORMING APPARATUSES 104<br>CASSETTE 3 | IMAGE FORMING APPARATUSES 103<br>CASSETTE 1 | IMAGE FORMING APPARATUSES 103<br>AUTOMATIC SWITCH  909 |

FIG. 9B

CASSETTE 1
- SIZE: A4
- ORIENTATION: Portrait
- GRAMMAGE: 100gsm
- USED AMOUNT: 300sheets

CASSETTE 2
- SIZE: A4
- ORIENTATION: Portrait
- GRAMMAGE: 100gsm
- USED AMOUNT: 10sheets

CASSETTE 3
- SIZE: A4
- ORIENTATION: Portrait
- GRAMMAGE: 100gsm
- USED AMOUNT: 200sheets

CASSETTE 4
- SIZE: A4
- ORIENTATION: Portrait
- GRAMMAGE: 100gsm
- USED AMOUNT: 100sheets

FIG. 9C

- SIZE: A4
- ORIENTATION: Landscape
- GRAMMAGE: 100gsm
- USED AMOUNT: 250sheets

- SIZE: A4
- ORIENTATION: Landscape
- GRAMMAGE: 100gsm
- USED AMOUNT: 30sheets

- SIZE: A4
- ORIENTATION: Landscape
- GRAMMAGE: 100gsm
- USED AMOUNT: 100sheets

- SIZE: A4
- ORIENTATION: Landscape
- GRAMMAGE: 100gsm
- USED AMOUNT: 32sheets

FIG. 9D

- SIZE: A4
- ORIENTATION: Portrait
- GRAMMAGE: 100gsm
- USED AMOUNT: 5sheets

- SIZE: A4
- ORIENTATION: Portrait
- GRAMMAGE: 100gsm
- USED AMOUNT: 10sheets

- SIZE: A3
- ORIENTATION: Landscape
- GRAMMAGE: 150gsm
- USED AMOUNT: 20sheets

- SIZE: A4
- ORIENTATION: Portrait
- GRAMMAGE: 120gsm
- USED AMOUNT: 150sheets

FIG. 12A

PRINTING JOB TRANSMISSION DESTINATION SELECTION

TRANSMISSION DESTINATION:

| | |
|---|---|
| IMAGE FORMING APPARATUSES 102 | ✓ OPERATING |
| IMAGE FORMING APPARATUSES 103 | ✓ OPERATING |
| IMAGE FORMING APPARATUSES 104 | ✓ OPERATING |

[ OK ]  [ CANCEL ]

FIG. 12B

PRINTING JOB TRANSMISSION DESTINATION SELECTION

TRANSMISSION DESTINATION:

| | |
|---|---|
| IMAGE FORMING APPARATUSES 102 | ✓ OPERATING |

[ OK ]  [ CANCEL ]

FIG. 12C

PRINTING JOB TRANSMISSION DESTINATION SELECTION

TRANSMISSION DESTINATION:

| | | |
|---|---|---|
| IMAGE FORMING APPARATUSES 102 | ✓ OPERATING | ✓ PAPER EXISTS |
| IMAGE FORMING APPARATUSES 103 | ✓ OPERATING | ✗ NO PAPER |
| IMAGE FORMING APPARATUSES 104 | ✓ OPERATING | ✗ NO PAPER |

[ OK ]  [ CANCEL ]

```
PRINTING JOB TRANSMISSION DESTINATION SELECTION
TRANSMISSION DESTINATION:      1203       1231
1202 — IMAGE FORMING APPARATUSES 102  ☑ OPERATING  ☑
       IMAGE FORMING APPARATUSES 103  ☑ OPERATING  ☒
       IMAGE FORMING APPARATUSES 104  ☑ OPERATING  ☒

[ OK ]              [ CANCEL ]
```

```
PRINTING JOB TRANSMISSION DESTINATION SELECTION
TRANSMISSION DESTINATION:      1203           1241
1202 — IMAGE FORMING APPARATUSES 102  ☑ OPERATING  PAPER EXISTS
       IMAGE FORMING APPARATUSES 103  ☑ OPERATING  NO PAPER
       IMAGE FORMING APPARATUSES 104  ☑ OPERATING  NO PAPER

[ OK ]              [ CANCEL ]
```

```
PRINTING JOB TRANSMISSION DESTINATION SELECTION
TRANSMISSION DESTINATION:  1202    1203      1221         1251
IMAGE FORMING APPARATUSES 102  ☑ OPERATING  ☑ PAPER EXISTS  TRAY 2
IMAGE FORMING APPARATUSES 103  ☑ OPERATING  ☑ NO PAPER      AUTOMATIC PAPER FEEDING
IMAGE FORMING APPARATUSES 104  ☑ OPERATING  ☑ NO PAPER      AUTOMATIC PAPER FEEDING

[ OK ]              [ CANCEL ]
```

FIG. 16

```
<JMF>
    <Response ID="M1" refID="Q1" Type="Status" xsi:type="ResponseStatus">
        <DeviceInfo DeviceStatus="Running">
1601 ──── <JobPhase Amount="2560" TotalAmount="3000" JobID="678" JobPartID="01"
                PercentCompleted="52" QueueEntryID="Job 05" Status="InProgress"/>
1602 ──── <JobPhase Amount="0" TotalAmount="200" JobID="679" JobPartID="01"
                PercentCompleted="0" QueueEntryID="Job 06" Status="Ready"/>
1603 ──── <JobPhase Amount="0" TotalAmount="200" JobID="680" JobPartID="01"
                PercentCompleted="0" QueueEntryID="Job 06" Status="Ready"/>
        </DeviceInfo>
    </Response>
</JMF>
```

FIG. 17

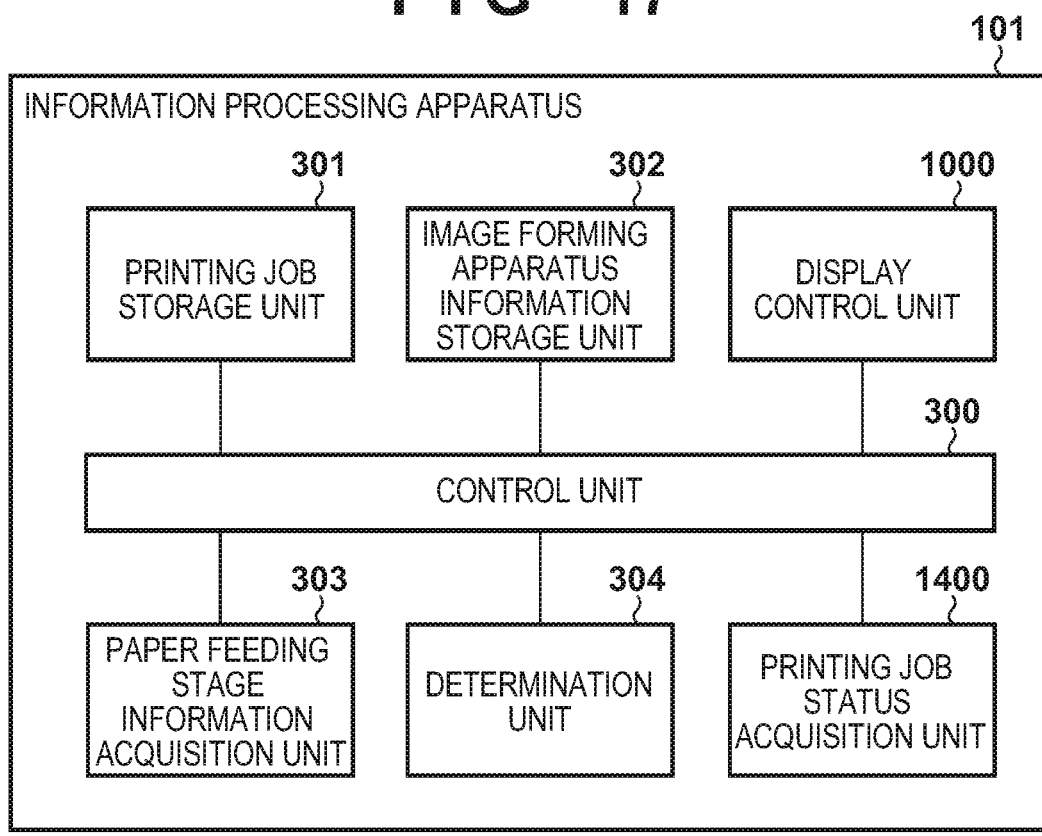

INFORMATION PROCESSING APPARATUS THAT DETERMINES AN IMAGE FORMING APPARATUS TO BE USED FOR A PRINTING JOB BASED ON A NUMBER OF SHEETS TO BE USED IN THE PRINTING JOB, AND RELATED IMAGE FORMING APPARATUS DETERMINATION METHOD AND STORAGE MEDIUM

This application claims the benefit of Japanese Patent Application No. 2017-183833, filed Sep. 25, 2017, which is hereby incorporated by reference herein in its entirety.

BACKGROUND OF THE INVENTION

Field of the Invention

The present invention relates to an information processing apparatus, an image forming apparatus determination method, and a storage medium, and, in particular, relates to a technique for reducing labor required for paper replacement, and saving time.

Description of the Related Art

In the commercial printing industry, there is an increasing demand for small-lot and wide-variety printing. Accordingly, the number of types of paper that is handled in a day at a printing site has been increasing, and an operator frequently replaces paper in an image forming apparatus. Japanese Patent Laid-Open No. 2003-167709 discloses a technique for performing a request to an image forming apparatus that satisfies requirements instructed by an operator to perform printing.

In the technique described in Japanese Patent Laid-Open No. 2003-167709, the state of a paper feeding stage of the image forming apparatus is not taken into consideration, however, and thus, it is not possible to reduce the number of times paper is replaced. In addition, in the technique of Japanese Patent Laid-Open No. 2003-167709, in the case of paper replacement, it is not possible to reduce the trouble of an operator in removing paper before replacing the paper in the paper feeding stage of the image forming apparatus.

SUMMARY OF THE INVENTION

The present invention provides an information processing apparatus that reduces labor required for paper replacement, and saves time.

The present invention has the following configuration in order to achieve the above purpose.

According to a first aspect, the present invention provides an information processing apparatus connected to an image forming apparatus that can execute a printing job, the information processing apparatus comprising an acquisition unit configured to acquire a state of a paper feeding stage from an image forming apparatus of interest, a determination unit configured to determine, based on the state of the paper feeding stage, whether or not the image forming apparatus of interest has a number of sheets that are to be consumed for a printing job of interest, and a decision unit configured to determine the image forming apparatus determined by the determination unit to have the number of sheets, to be a transmission destination of the printing job of interest.

According to a second aspect, the present invention provides an information processing apparatus connected to an image forming apparatus that can execute a printing job, the information processing apparatus comprising an acquisition unit configured to acquire a state of a paper feeding stage from an image forming apparatus of interest, a determination unit configured to determine, based on the state of the paper feeding stage, whether or not the image forming apparatus of interest has a number of sheets that are to be consumed for a printing job of interest, a display unit configured to display the image forming apparatus determined by the determination unit to have the number of sheets such that the image forming apparatus can be distinguished from an image forming apparatus not determined to have the number of sheets, and a selection unit configured to select an image forming apparatus that is a transmission destination of the printing job of interest from among image forming apparatuses displayed by the display unit, according to an operation performed by an operator.

Further features of the present invention will become apparent from the following description of exemplary embodiments with reference to the attached drawings.

BRIEF DESCRIPTION OF THE DRAWINGS

FIGS. 7A and 7B are diagrams showing an example of paper feeding stage information according to the first embodiment.

FIG. 8 is a diagram of a sequence between the information processing apparatus and an image forming apparatus according to the first embodiment.

FIGS. 9A to 9D are schematic diagrams of processing according to the first embodiment.

FIGS. 12A to 12F are diagrams each showing an example of a screen for selecting a transmission destination of a printing job according to the second embodiment.

FIG. 16 is a diagram showing an example of a printing job status according to the third embodiment.

FIG. 17 is a block diagram showing the software configuration of an information processing apparatus according to a fourth embodiment.

DESCRIPTION OF THE EMBODIMENTS

Embodiments for carrying out the invention will be described below with reference to the drawings.

First Embodiment

Configuration Example of Information Processing System

Figure 1:
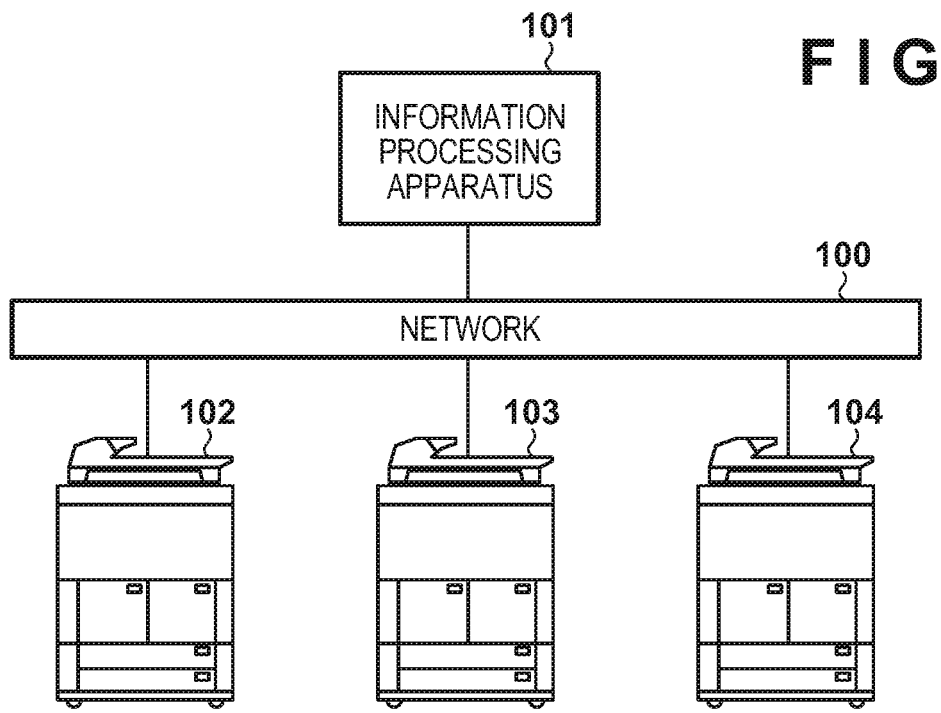
FIG. 1 is a diagram of the system configuration of an information processing system according to a first embodiment.

FIG. 1 is a diagram showing the entire configuration of an information processing system according to the present invention. Note that the environments of the entire information processing system in the following description are set for ease of describing the present invention, and the present invention is not limited to such environments. In FIG. 1, an information processing apparatus 101 and image forming apparatuses 102 to 104 are connected to a network 100.

The image forming apparatuses 102 to 104 execute a printing job sent from the information processing apparatus 101, analyze printing data including typing data that is received along with the printing job, convert each page of the printing data into a dot image, and print the dot image. Note that the image forming apparatuses 102 to 104 have paper feeding stages. One paper feeding stage refers to each cassette of an image forming apparatus that functions as a paper feeding mechanism, for example. Alternatively, one paper feeding stage may be a paper feeding tray or a paper feeding apparatus having a large capacity. For example, when sheet-like paper (hereafter, also referred to as a sheet) is set in a paper feeding stage, the image forming apparatus stores the attribute information of the paper that is set. The attribute information includes size, paper type (such as plain paper, coated paper, or high-quality paper), grammage, sheet direction, and the like. For example, a size or a sheet direction may be obtained by detecting the sheet itself, or may be obtained by detecting the position of a movable partition plate provided in a cassette, or the like, using a sensor. A configuration may be adopted in which default values for a paper type and a grammage are determined in advance, and the operator performs setting regarding a sheet check of a grammar paper type or a grammage that does not match the default value, from the information processing apparatus 101, or directly in the image forming apparatuses 102 to 104, for example. The image forming apparatuses 102 to 104 have a function of providing attribute information of stored paper as well as attribute information of a cassette (paper feeding stage) in which paper having the attribute is set, the remaining amount of paper in each paper feeding stage, and the like, as paper feeding stage information, to the information processing apparatus 101. The paper feeding stage information will be described later using an example.

Programs, such as a job management program for managing manufacturing of printed articles and a Web server, run on the information processing apparatus 101. Also, a printer driver program for connecting to the image forming apparatuses 102 to 104 via the network 100, and controlling the image forming apparatuses 102 to 104, and the like, are installed in the information processing apparatus 101. In FIG. 1, one information processing apparatus 101 is shown, but a plurality of information processing apparatuses 101 may be used. In addition, there are a plurality of image forming apparatuses (102 to 104), but one image forming apparatus may be used. Moreover, the network 100 may be the Internet, and, for example, a configuration may be adopted in which the image forming apparatuses 102 to 104 are accessed from the information processing apparatus 101 via the Internet.

Example of Hardware Configuration of Information Processing Apparatus

Figure 2:
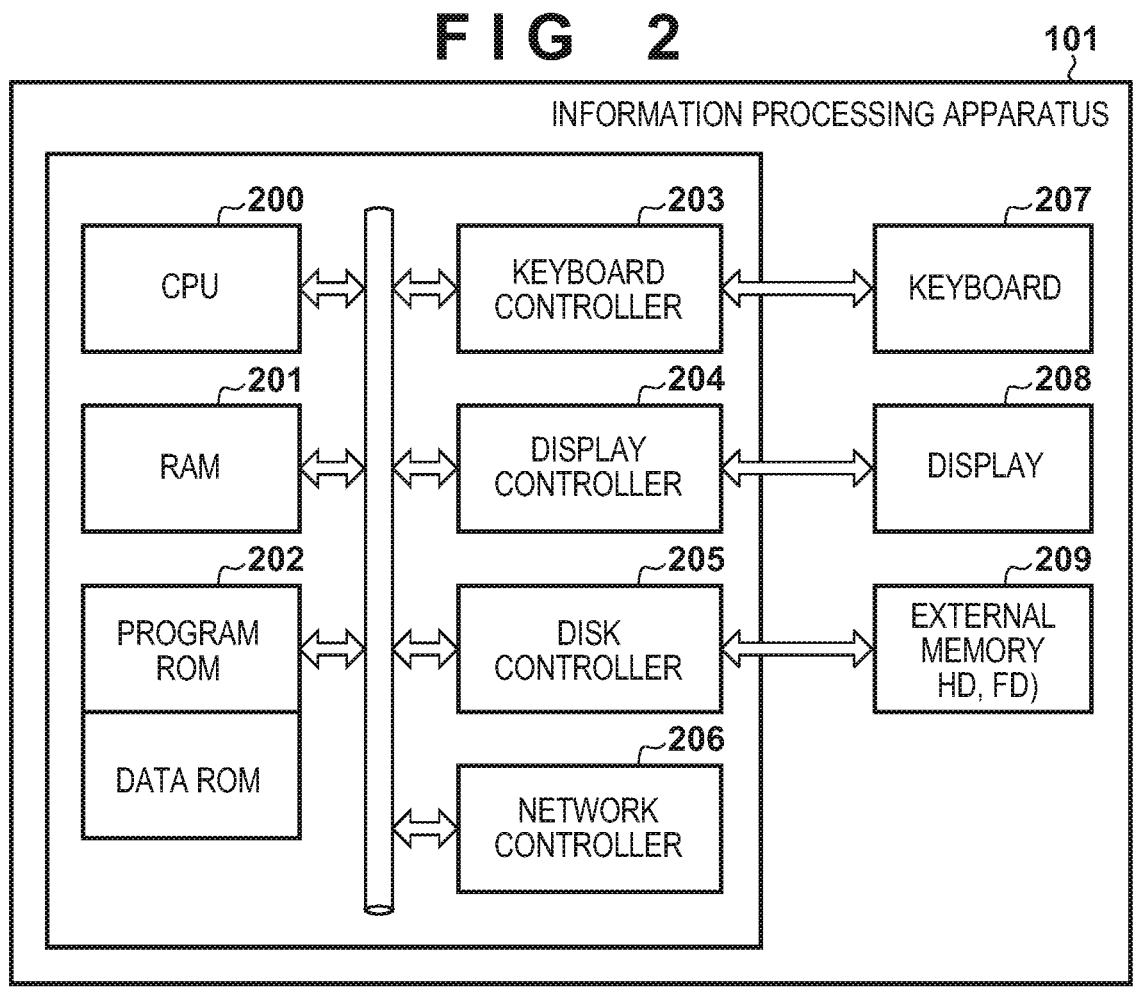
FIG. 2 is a block diagram showing the hardware configuration of an information processing apparatus according to the first embodiment.

FIG. 2 shows the hardware configuration of the information processing apparatus 101 of this embodiment. The information processing apparatus 101 can be constituted by the hardware of a general computer (i.e., a personal computer (PC)). In FIG. 2, a central processing unit (CPU) (or a processor) 200 executes a program stored in a memory, for example, a program in a read only memory (ROM) 202, and programs, such as an operating system (OS) and an application program that are loaded from a hard disk 209 to a random access memory (RAM) 201. Accordingly, by executing such programs stored in readable storage mediums, the CPU 200 functions as processing units that execute processing of flowcharts that will be described later. The RAM 201 is a main memory of the CPU 200, and functions as a work area, and the like. A keyboard controller 203 controls operation input made from a keyboard 207, a barcode reader (not illustrated), and a pointing device (e.g., a mouse, a touch pad, a touch panel, or a trackball). A display controller 204 controls display of a display 208. A user interface is provided by the display 208 and a pointing device, and the user can perform printing setting, set a transmission destination of a printing job, and the like, via the user interface. A disk controller 205 controls data access to the external memory 209, such as a hard disk (HD) or a flexible disk (FD) that stores various types of data. These external memories are computer-readable non-transitory storage media. A network controller 206 is connected to the network 100, and executes processing for controlling communication with another device connected to the network.

Example of Software Configuration of Information Processing Apparatus

Figure 3:
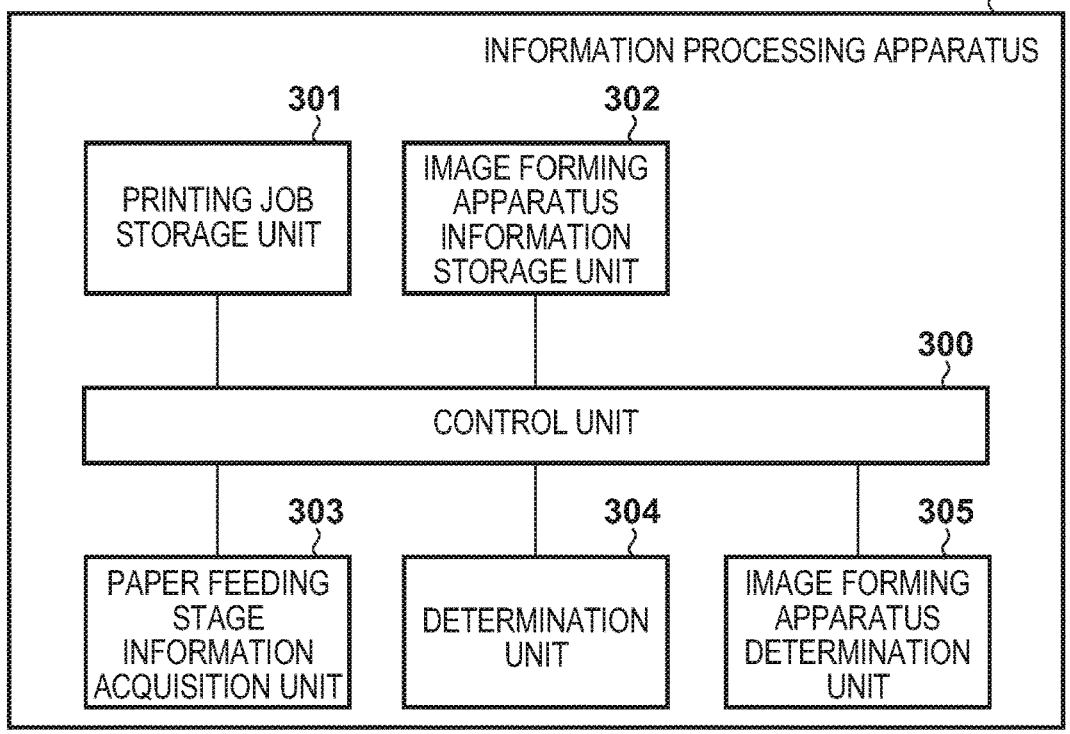
FIG. 3 is a block diagram showing the software configuration of the information processing apparatus according to the first embodiment.

FIG. 3 is a block diagram showing functions of the information processing apparatus 101 of this embodiment. The functions are each realized by a program being executed by the CPU 200 using hardware resources of the information processing apparatus 101. A control unit 300 performs execution control of functional blocks 301 to 305 of the information processing apparatus 101. A printing job storage unit 301 stores all of the printing jobs in the information processing apparatus 101. Specifically, in addition to printing jobs that have been sent to the image forming apparatuses 102 to 104, the printing job storage unit 301 stores all of the printing jobs that are to be transmitted to the image forming apparatuses 102 to 104.

An image forming apparatus information storage unit 302 stores information regarding image forming apparatuses registered in the information processing apparatus 101. A method for storing such information may be a method for storing information regarding all of the image forming apparatuses, or may be a method for determining which image forming apparatus to use for each work flow and storing information regarding the image forming apparatus. In any case, it is sufficient that the image forming apparatus to be used for a printing job of interest can be determined, and information regarding the image forming apparatus is stored such that the state thereof can be recognized, and there is no limitation to a method for storing information regarding an image forming apparatus. Note that, in this embodiment, the internet protocol (IP) address and port number of the image forming apparatus, the model type of the image forming apparatus, and paper feeding stage information obtained from the paper feeding stage information acquisition unit 303, which will be described later, are stored as information regarding an image forming apparatus (image forming apparatus information). Image forming apparatus information excluding paper feeding stage information may be separately obtained using simple network management protocol (SNMP), or the like, and be stored. Paper feeding tray information includes attributes, such as the size and the type of paper, the remaining amount, and the like, in each paper feeding stage. In addition, in a case in which a post-processing unit can be attached to the image forming apparatus, image forming apparatus information may include the presence or the absence and the type of the post processing unit. In this embodiment, the image forming apparatus information storage unit 302 stores information regarding the image forming apparatuses 102 to 104. Note that a work flow is a block of a series of jobs that are executed in a predetermined order by the image forming apparatuses 102 to 104 connected to the information processing apparatus 101, a post-processing apparatus (not illustrated), and the like. The work flow may further include manual processing that is performed by a worker.

The paper feeding stage information acquisition unit 303 makes an inquiry to image forming apparatuses registered in the image forming apparatus information storage unit 302, and obtains paper feeding stage information regarding the image forming apparatuses.

A determination unit 304 determines, based on paper feeding stage information acquired from image forming apparatuses by the paper feeding stage information acquisition unit 303 and information regarding paper that is to be used for a printing job to be transmitted to an image forming apparatus, whether or not the image forming apparatuses have paper that is to be used for the printing job of interest. The paper information is written in printing job information in which the printing job is defined. Note that the image forming apparatuses 102 to 104 are image forming apparatuses that form an image onto a sheet that is a printing medium, but the sheet is not limited to paper. In this example, however, a sheet material onto which data is recorded is referred to as paper.

An image forming apparatus determination unit 305 determines a transmission destination of a printing job based on a determination result of the determination unit 304. The determination procedure will be described later with reference to FIG. 4. In this embodiment, an image forming apparatus that reduces a workload for paper replacement is selected. Specifically, an image forming apparatus in which paper replacement or paper replenishment does not occur in order to execute a printing job of interest, or while a printing job of interest is being executed, is preferentially selected. In addition, in a case in which it is found, as a result of determination performed by the determination unit, that paper replacement or paper replenishment occurs in all of the image forming apparatuses, an image forming apparatus in which a paper replacement workload is small, or desirably, an image forming apparatus in which a paper replacement workload is the smallest, is determined to be a transmission destination of the printing job.

Sequence of Messages Between Information Processing Apparatus and Image Forming Apparatus During Printing Processing FIG. 8 is a diagram showing sequences of message exchanges and processing between an information processing apparatus and an image forming apparatus in this embodiment. In FIG. 8, an inquiry 800 and a response 801 constitute a sequence when the information processing apparatus 101 obtains paper feeding stage information from the image forming apparatuses 102 to 104. First, regarding the inquiry 800, the information processing apparatus 101 makes an inquiry to the image forming apparatuses 102 to 104. Next, regarding the response 801, an image forming apparatus that received the inquiry returns paper feeding stage information as a response to the information processing apparatus 101. In addition, in processing 804, processing that is based on the flowchart in FIG. 4 (in particular, step S401 onward) is executed, and an image forming apparatus that is to be a transmission destination of a printing job of interest is selected.

In FIG. 8, processes from a command 805 to a response 809 constitute a sequence of printing execution. Regarding the command 805, the information processing apparatus 101 transmits a printing job to the image forming apparatus determined in 804. Regarding a response 806, the image forming apparatus returns a response indicating that the printing job has been received, to the information processing apparatus 101. Regarding printing processing 807, the image forming apparatus executes printing processing of the printing job. Regarding a notification 808, the image forming apparatus notifies the information processing apparatus 101 of the progression status of the printing processing of the printing job. The number of times the notification 808 is given is not limited to one. Regarding a command 809, the image forming apparatus transmits a command indicating that printing is complete, to the information processing apparatus 101, at the time when the printing processing of the printing job is complete.

Example of Paper Feeding Stage Information

FIGS. 7A and 7B show examples of paper feeding stage information (also referred to as paper feeding tray information) in this embodiment that is transmitted as the response 801 in FIG. 8 from an image forming apparatus. In this embodiment, paper feeding stage information is expressed using Job Definition Format (JMF) that is a standard of commercial printing.

In FIG. 7A, an inquiry 700 is an example of the inquiry 800 in FIG. 8 that is made by the information processing apparatus 101 to the image forming apparatuses 102 to 104 in order to acquire paper feeding stage information. Note that the information processing apparatus 101 acquires paper feeding stage information from the image forming apparatuses 103 and 104 as well similarly to the image forming apparatus 102, and a description thereof is omitted below.

Regarding the inquiry 700, an element 701 is instruction content of the inquiry. Information desired to be acquired from an image forming apparatus is designated as "ResourceName" attribute. Here, "Media" is designated, and thus, the information processing apparatus 101 acquires information regarding a medium, in other words paper from the image forming apparatus of interest. In addition, the scope of content to be acquired is designated as "Scope" attribute. Here, "Present" is designated, and thus, the information processing apparatus 101 only acquires information regarding paper that is currently set on the paper feeding tray of the image forming apparatus.

In FIG. 7B, paper feeding stage information 702 is an example of paper feeding stage information included in a response acquired by the information processing apparatus 101 from the image forming apparatus 102. In the paper feeding stage information 702, information regarding the attribute of paper that is set in the paper feeding stage of the image forming apparatus 102 is written.

In the paper feeding stage information 702, an element 703 indicates a paper attribute that characterizes the paper. Specifically, a paper name (DescriptiveName), a paper size (Dimension), a surface property (FrontCoatings), and a grammage (Weight) are written.

Elements 704 to 707 indicate cassettes in which paper characterized by the paper attribute 703 is currently set. One set of paper may be set in one cassette, or may be set in a plurality of cassettes. In this example, as indicated by the elements 704 to 707, paper is set in four cassettes (Tray-1, Tray-2, Tray-3, and Tray-4).

Elements 708 to 711 indicate a paper name, a direction in which paper is set (Orientation) and a paper remaining amount (ActualAmount) in the paper feeding stages indicated by the elements 704 to 707, respectively. Note that the direction in which paper is set refers to Short Edge Feed in the case in which a value "Rotate0" is designated, and refers to Long Edge Feed in the case in which a value "Rotate90" is designated.

As described above, image forming apparatuses transmit paper feeding stage information in response to an inquiry regarding paper feeding stage information given to the image forming apparatuses. In the paper feeding stage information, as shown in FIGS. 7A and 7B, an attribute of paper, paper feeding stages in which paper having the attribute is set, and remaining amounts in the paper feeding stages are indicated. Note that, in FIGS. 7A and 7B, the number of types of paper that is set is one, but a plurality of types of paper may be set. In that case, the attributes of a plurality of types of paper are indicated, and a paper name, a direction, and a remaining amount are indicated for each of the paper feeding stages.

Flowchart of Entire Processing

Figure 4:
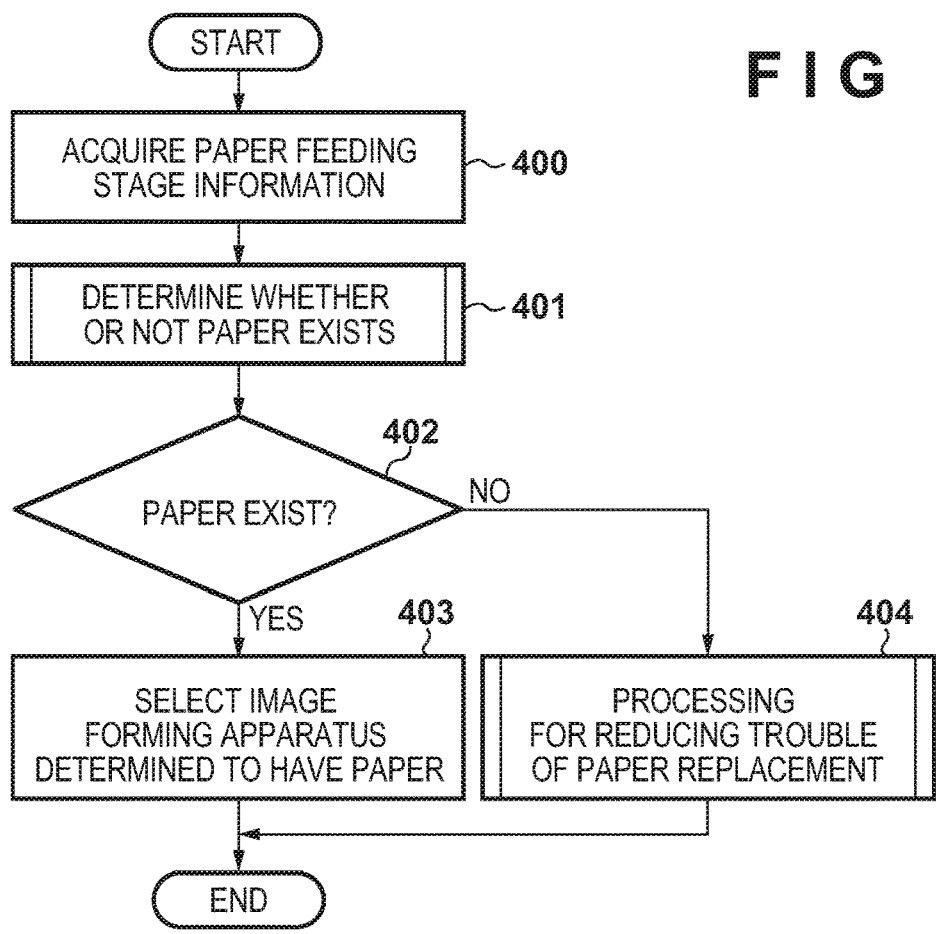
FIG. 4 is a flowchart of an entire processing according to the first embodiment.

FIG. 4 is a flowchart mainly showing image forming apparatus selection processing (the processing 804 in FIG. 8) in this embodiment. Note that step S400 corresponds to the inquiry 800 and the response 801 in FIG. 8. Programs according to respective flows are stored in the ROM 202 of the information processing apparatus 101 or the external memory 209, are read out to the RAM 201, and are executed by the CPU 200. Note that the same applies to programs according to respective flows that will be described with reference to flowcharts in the following description. Note that the functional blocks in FIG. 3 are realized by the CPU 200, and thus, in the following description, the processing will be described as being performed by one of function blocks shown in FIG. 3. The processing is executed, however, by the CPU 200 in terms of hardware.

In step S400, the paper feeding stage information acquisition unit 303 acquires paper feeding stage information from image forming apparatuses registered in the image forming apparatus information storage unit 302. This corresponds to the inquiry 800 and the response 801 in FIG. 8. All or a portion of the registered image forming apparatuses are target image forming apparatuses, but, in this example, all of the registered image forming apparatuses are targeted. Specifically, the paper feeding stage information acquisition unit 303 makes an inquiry to each of the image forming apparatuses registered in the image forming apparatus information storage unit 302. An image forming apparatus that has received the inquiry returns, as a response, paper feeding stage information to the paper feeding stage information acquisition unit 303. The paper feeding stage information acquisition unit 303 analyzes the response, extracts paper feeding stage information, and stores the paper feeding stage information in the image forming apparatus information storage unit 302 in association with the corresponding image forming apparatus. Note that the inquiry and response will be described later using examples.

In step S401, the determination unit 304 references paper feeding stage information for each image forming apparatus, and determines whether or not paper that is to be used for a printing job of interest (hereafter, referred to as necessary paper) is set in the paper feeding stage of the image forming apparatus. The printing job of interest here refers to a printing job that is about to be transmitted to an image forming apparatus. Step S401 will be described in detail with reference to FIG. 5. In step S402, in a case in which there is an image forming apparatus in which necessary paper is set, the determination unit 304 advances the procedure to step S403, and, in a case in which necessary paper is not set in any image forming apparatus, the determination unit 304 advances the procedure to step S404. In step S403, the image forming apparatus determination unit 305 selects an image forming apparatus determined in step S402 to have necessary paper that is set therein.

At this time, if there is an image forming apparatus with respect to which information is stored indicating that the paper feeding stage of the image forming apparatus is a preferential paper feeding stage (which will be described with reference to FIG. 5), the image forming apparatus is preferentially selected. In a case in which there are a plurality of image forming apparatuses that are candidates, image forming apparatuses are selected from the top of the list in order. The selected image forming apparatus is an image forming apparatus that is a transmission destination of the printing job of interest, and is set as an image forming apparatus to which the printing job of interest is to be transmitted. Furthermore, in this case, in printing job information, a paper feeding stage in which necessary paper is placed may be designated as a paper feeding stage that is to be used.

On the other hand, there are also cases in which an image forming apparatus selected as a transmission destination of a printing job of interest is an image forming apparatus that can supply necessary paper only by switching a plurality of paper feeding stages. In this case, the printing job of interest is set so as to switch between paper feeding stages, based on information regarding an automatic switch between paper feeding stages stored in step S506 in FIG. 5, which will be described later. In this setting process, a paper feeding stage that is used first and a paper feeding stage to which a switch is made when paper runs out in the first paper feeding stage may be set. In step S404, the image forming apparatus determination unit 305 performs processing for reducing the trouble for paper replacement. Step S404 will be described later in detail with reference to FIG. 6. Due to the above-described steps, the information processing system of this embodiment can reduce the number of times paper replacement is performed before a printing job is executed or while a printing job is being executed.

Flowchart of Determination Procedure

Figure 5:
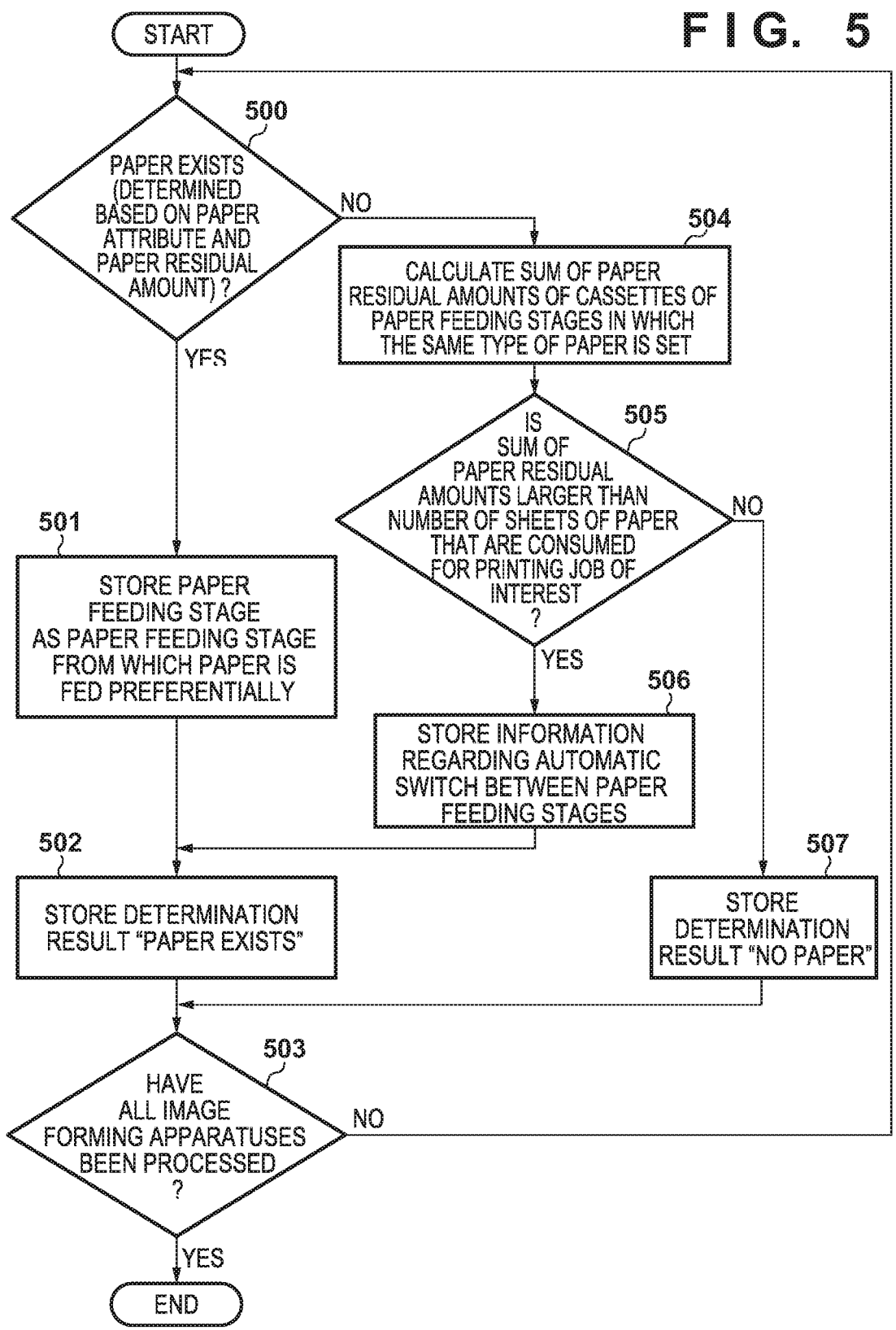
FIG. 5 is a flowchart of processing for determining whether or not there is paper according to the first embodiment.

FIG. 5 is a flowchart for describing step S401 in FIG. 4 in detail. In the procedure in FIG. 5, processing is sequentially performed with a focus on image forming apparatuses regarding which information is stored in the image forming apparatus information storage unit 302. An image forming apparatus that is currently focused is referred to as an image forming apparatus of interest. In step S500, the determination unit 304 determines, based on a paper attribute and a paper remaining amount included in paper feeding stage information of an image forming apparatus of interest obtained in step S400, whether or not the paper feeding stage of the image forming apparatus of interest has paper that is to be used for a printing job of interest (in other words, "necessary" paper). Examples of the paper attribute include paper size, paper type, grammage, and surface property. As a matter of course, attributes other than these may be included. If it is determined that there is necessary paper on the paper feeding stage of the image forming apparatus of interest, the paper attribute determination unit 304 stores the corresponding paper feeding stage, and advances the procedure to step S501, and if it is determined that there is no necessary paper, advances the procedure to step S504. Note that the case in which it is determined that there is necessary paper refers to the case in which the amount of paper (sheet) that has an attribute to be used for a printing job of interest, and remains in the paper feeding stage of the image forming apparatus of interest is at least greater than the amount of paper that is to be consumed for the printing job. Conversely, the case in which there is no necessary paper refers to the case in which at least one of the paper attribute requirement and paper remaining amount requirement is not satisfied.

In step S501, the determination unit 304 stores, in association with the image forming apparatus of interest, information regarding the paper feeding stage that was specified and stored in step S500, and stores, in association with the paper feeding stage, information indicating that the paper feeding stage is a paper feeding stage from which paper is fed preferentially (a preferential paper feeding stage). In step S502, the determination unit 304 stores a determination result "paper exists" regarding the image forming apparatus of interest. In step S503, the determination unit 304 determines whether or not all of the image forming apparatuses have been processed. If all of the image forming apparatuses have been processed, the determination unit 304 ends this flowchart, and, if there is an unprocessed image forming apparatus, advances the procedure to step S500. Note that if the preferential paper feeding stage was stored in step S501, the procedure may be ended in step S503 and be returned to step S402. In this case, an image forming apparatus that has a preferential paper feeding stage, and was found earliest is a transmission destination of the printing job of interest.

On the other hand, in step S504, the determination unit 304 calculates the sum of paper remaining amounts of paper feeding stages in which paper that is to be used for the printing job of interest is set, in consideration of the case in which necessary paper is set over a plurality of cassettes. In step S505, the determination unit 304 determines whether or not the sum of paper remaining amounts is greater than or equal to the number of sheets of paper that is to be consumed for the printing job of interest. If the sum of paper remaining amounts is greater than or equal to the number of sheets of paper that is to be consumed for the printing job of interest, the determination unit 304 advances the procedure to step S506, and, if the sum of paper remaining amounts is less than the number of sheets of paper that is to be consumed for the printing job of interest, advances the procedure to step S507. In step S506, the determination unit 304 stores information regarding an automatic switch between paper feeding stages. This information includes, for example, information indicating that a switch is made between paper feeding stages when paper runs out, and information for designating a paper feeding stage that is used first and a paper feeding stage to which a switch is made. Also, in this case, in step S502, a determination result "paper exist" is stored regarding the image forming apparatus of interest. In step S507, the determination unit 304 stores a determination result "no paper" regarding the image forming apparatus of interest. Information regarding an automatic switch between paper feeding stages stored in step S506 is referenced in order to set the printing job of interest so as to automatically switch between paper feeding stages when the image forming apparatus of interest is determined as a transmission destination of the printing job of interest.

Flowchart of Processing for Reducing Trouble for Paper Replacement

Figure 6:
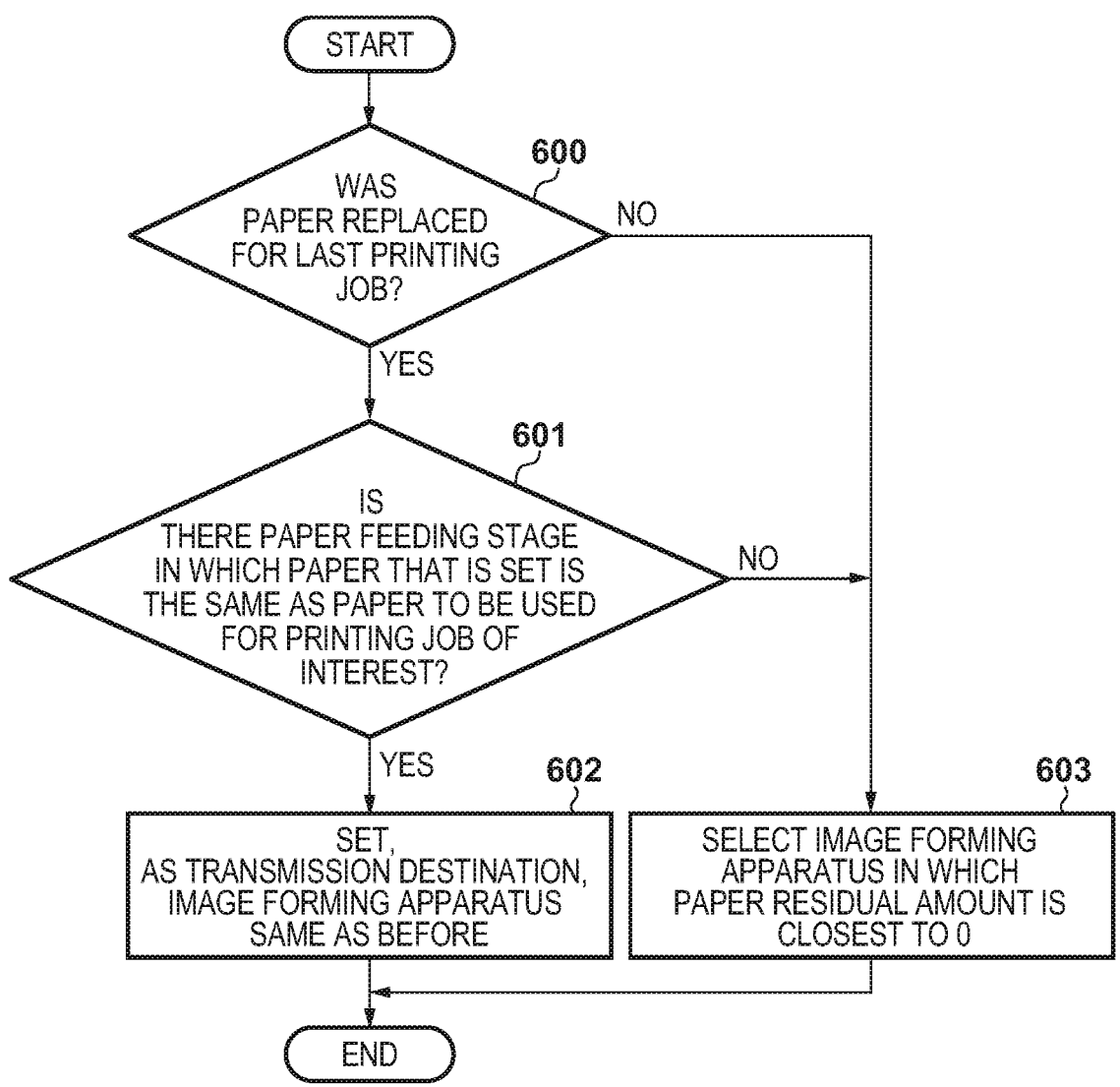
FIG. 6 is a flowchart of processing for reducing trouble associated with paper replacement according to the first embodiment.

FIG. 6 is a flowchart for describing step S404 in FIG. 4 in detail. In step S600, the image forming apparatus determination unit 305 specifies an image forming apparatus in which paper was replaced in the previous processing. The previous processing is processing of the last printing job that has been executed in each image forming apparatus, for example. In a case in which paper was replaced while a printing job was being executed, it is determined that paper was replaced in the previous processing. Note that paper replacement mentioned here particularly includes replenishment of the same type of paper due to paper having run out. For example, paper replacement information is cleared before a printing job is executed in an image forming apparatus, and, if paper was replaced (in particular, paper replenishment due to paper having run out) while a printing job is being executed, paper replacement information is set, in order to make a determination regarding paper replacement. Paper replacement information may include information indicating a paper feeding stage in which paper was replenished. With such a configuration, if the paper replacement information is referenced in step S600, it is possible to identify an image forming apparatus in which paper was replaced in the previous processing, and, furthermore, a paper feeding stage can also be identified. It suffices for this paper replacement information to be included in paper feeding stage information that is acquired from the image forming apparatus in step S400.

In a case in which the number of image forming apparatuses in which paper was replaced in the previous processing is at least one, the image forming apparatus determination unit 305 advances the procedure to step S601, and, if there is no image forming apparatuses in which paper was replaced in the previous processing, advances the procedure to step S603.

In step S601, the image forming apparatus determination unit 305 specifies an image forming apparatus having a paper feeding stage in which paper was replaced, and that has paper that is the same as paper to be used for the printing job of interest, from among image forming apparatuses in which paper was replaced. If there is such an image forming apparatus, the image forming apparatus determination unit 305 advances the procedure to step S602, and, if there is no such image forming apparatus, advances the procedure to step S603.

In step S602, the image forming apparatus determination unit 305 selects the image forming apparatus as a transmission destination of a job of interest from among the image forming apparatuses specified in step S601. An image forming apparatus in which paper was replenished in the last printing job, and which has a paper feeding stage in which the same paper as paper that is to be used for the printing job of interest is set, is selected, or such a paper feeding stage is selected. In a case in which there are a plurality of such image forming apparatuses, an image forming apparatus in which the paper remaining amount after replenishment is large (desirably, the greatest) is selected. Note that, in this embodiment, an image forming apparatus in which the paper remaining amount after replenishment is the greatest is selected, but, if the difference between the greatest paper remaining amount after replenishment and the second greatest paper remaining amount after replenishment is not large, an image forming apparatus in which the paper remaining amount after replenishment is the second greatest may be selected.

Note that, in this embodiment, the paper remaining amount is acquired based on paper feeding stage information, and thus, a configuration may be adopted in which step S600 is skipped and step S601 is executed, and, if there are image forming apparatuses that satisfy the requirement, an image forming apparatus having a paper feeding stage in which the paper remaining amount is the greatest is selected. Note that, by determining in step S600 whether or not paper was exchanged, for example, in a case in which the paper remaining amount could not be acquired, or even in a case in which the acquired paper remaining amount is a round number, an image forming apparatus in which the remaining amount of necessary paper is estimated to be large (desirably, the greatest) can be selected.

On the other hand, in step S603, the image forming apparatus determination unit 305 performs setting regarding a printing job such that an image forming apparatus that has a paper feeding stage in which the paper remaining amount is 0, from among image forming apparatuses registered in the image forming apparatus information storage unit 302, is set as a transmission destination of the printing job. In that case, the paper feeding stage in which the paper remaining amount is 0 is set as a paper feeding stage that is to be used. In addition, if there is no such image forming apparatus, setting is performed regarding a printing job such that an image forming apparatus having a paper feeding stage in which the paper remaining amount is closest to 0 is set as a transmission destination of the printing job. In that case, the paper feeding stage in which the paper remaining amount is the closest to 0 is set as a paper feeding stage that is to be used. By selecting, as a paper feeding stage that is to be used for a printing job of interest, a paper feeding stage in which the paper remaining amount is small (desirably, the smallest) in this manner, labor for removing the placed paper at the time of paper replacement is reduced. Note that, in this embodiment, an image forming apparatus having a paper feeding stage in which the paper remaining amount is the closest to 0 is used as a transmission destination of a printing job, but, in a case in which there are a plurality of paper feeding stages in which the paper remaining amount is close to 0, a paper feeding stage in which the paper remaining amount is the second closest to 0, not a paper feeding stage in which the paper remaining amount is closest to 0, may be selected.

The above-described steps make it possible for the information processing system of this embodiment to reduce the workload for removing paper from an image forming apparatus in the case of paper replacement. Specifically, in a case in which there is an image forming apparatus in which paper that is to be used for a printing job of interest is set, the image forming apparatus is selected as a transmission destination of the printing job of interest. In that case, an image forming apparatus in which necessary paper is set in one paper feeding stage is selected with the highest priority. In addition, an image forming apparatus in which necessary paper is set in a plurality of paper feeding stages in a separate manner is selected with the second priority. Moreover, if there is an image forming apparatus in which paper that satisfies the requirement of attribute, such as a type of paper, is set although the paper remaining amount is less than the necessary amount, the image forming apparatus is selected with the third priority. In addition, in a case in which necessary paper is not set in any image forming apparatus, an image forming apparatus having a paper feeding stage in which the paper remaining amount is small (desirably, the smallest) is selected with the fourth priority. In all of the image forming apparatuses, a paper feeding stage that meets a selected requirement is set as a paper feeding stage that is to be used for the printing job of interest.

Specific Example of Processing of this Embodiment

FIGS. 9A to 9D are schematic diagrams for describing examples of processing of this embodiment. In FIG. 9A, use cases 900 to 904 refer to use cases in which processing in this embodiment is applied. The use cases 900 to 904 refer to cases in which three printing jobs are stored in the printing job storage unit 301 of the information processing apparatus 101, and in each of these cases, image forming apparatus selection processing is performed in the order of a first printing job, a second printing job, and a third printing job. Pieces of information regarding paper that is to be used for the first printing job, the second printing job, and the third printing job are as illustrated. In addition, in FIGS. 9B to 9D, paper that is set in the paper feeding stages of the image forming apparatuses 102 to 104 are as illustrated. Each image forming apparatus has four paper feeding stages, and sheet bundles are respectively placed in the four paper feeding stages. Note that, in this embodiment, for convenience of description, the loading capacity of a paper feeding stage is set to 1000 at most, but the present invention is not limited by a difference in loading capacity.

Texts 905 to 909 written below the respective use cases indicate an image forming apparatus and a paper feeding stage assigned to each of the first printing job, the second printing job, and the third printing job as a result of performing image forming apparatus selection processing. For example, in the use case 900, when the information processing apparatus 101 transmits the first printing job to the above-described image forming apparatuses 102 to 104, as indicated by the text 905, the image forming apparatus 102 and a cassette 2 of the image forming apparatus 102 are selected as transmission destination of all of the first to third printing jobs.

In addition, in the use case 901, the image forming apparatus 103 and an automatic switch of the image forming apparatus 103 (from a cassette 1 to a cassette 3) are selected as transmission destinations of the first printing job. The image forming apparatus 104 and a cassette 1 of the image forming apparatus 104 are selected as transmission destinations of the second printing job. The image forming apparatus 103 and the cassette 1 of the image forming apparatus 103 are selected as transmission destinations of the third printing job.

In addition, in the use case 902, the image forming apparatus 104 and a cassette 4 of the image forming apparatus 104 are selected as transmission destinations of the first printing job. The image forming apparatus 104 and the cassette 1 of the image forming apparatus 104 are selected as transmission destinations of the second printing job. The image forming apparatus 104 and the cassette 1 of the image forming apparatus 104 are selected as transmission destinations of the third printing job.

Moreover, in the use case 903, the image forming apparatus 103 and a cassette automatic switch (the cassette 1 to the cassette 3) of the image forming apparatus 103 are selected as transmission destinations of the first printing job.

The image forming apparatus 104 and the cassette 1 of the image forming apparatus 104 are selected as transmission destinations of the second printing job. The image forming apparatus 104 and a cassette 3 of the image forming apparatus 104 are selected as transmission destinations of the third printing job.

Moreover, in the use case 904, the image forming apparatus 103 and a cassette automatic switch (the cassette 1 to the cassette 3) of the image forming apparatus 103 are selected as transmission destinations of the first printing job. The image forming apparatus 103 and the cassette 1 of the image forming apparatus 103 are selected as transmission destinations of the second printing job. The image forming apparatus 104 and the cassette 3 of the image forming apparatus 104 are selected as transmission destinations of the third printing job.

As described above, according to this embodiment, if there is an image forming apparatuses that can complete a printing job of interest without replacing or supplying paper, the image forming apparatus is preferentially selected. With such a configuration, paper does not need to be replaced. Among such image forming apparatuses, an image forming apparatus in which a switch does not need to be made between paper feeding stages is further given priority, and is selected with a high (desirably, highest) priority, and an image forming apparatus in which a switch needs to be made between paper feeding stages is selected next. With such a configuration, it is possible to avoid a situation in which paper placed in a paper feeding stage is used up, as much as possible, and to reduce labor for replacing and replenishing paper. In addition, this makes it possible to prevent delay of processing due to a switch between paper feeding stages, for example.

Furthermore, in a case in which a necessary amount of paper is not placed in any image forming apparatus, an image forming apparatus in which paper having a necessary attribute is placed is selected. Accordingly, work is complete only by replenishing necessary paper in a paper feeding stage that became empty during printing, and labor for paper replacement can be reduced.

Furthermore, in a case in which there is no image forming apparatus that satisfies any of the above requirements, an image forming apparatus having a paper feeding stage in which the amount of paper that is mounted is small (desirably, the smallest) is selected. Accordingly, the amount of paper that is removed at the time of paper replacement may be small, and labor for paper replacement is reduced. As described above, according to this embodiment, labor for paper replacement can be reduced.

Second Embodiment

In the first embodiment, a mode has been described in which an image forming apparatus in which paper replacement does not occur when executing a printing job is automatically determined based on paper information of the printing job and paper feeding stage information of the image forming apparatus. In addition, an embodiment has been described in which an image forming apparatus in which labor is estimated to be small even in a case in which paper replacement occurs is selected. On the other hand, there are also cases in which the operator manually selects an image forming apparatus in which a printing job is desired to be processed. In view of this, in a second embodiment, a mode will be described in which the operator manually selects an image forming apparatus. Accordingly, even in the above-described cases, the operator can select an image forming apparatus in which paper replacement does not occur.

Note that a description of the same contents as those in the first embodiment is omitted or simplified, and, in this embodiment, differences will be mainly described.

Example of Software Configuration of Information Processing Apparatus

Figure 10:
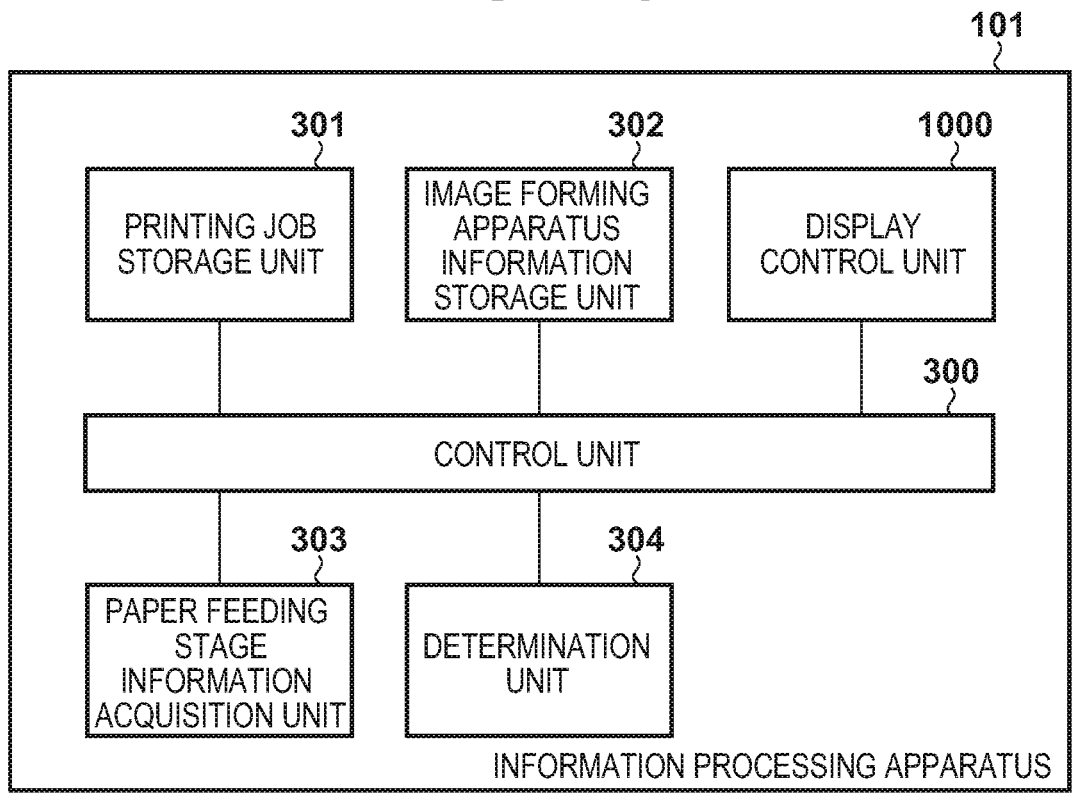
FIG. 10 is a block diagram showing the software configuration of an information processing apparatus according to a second embodiment.

FIG. 10 is a block diagram showing functions an information processing apparatus 101 of this embodiment. Blocks 300 to 304 are the same as those in FIG. 3 of the first embodiment, and thus, a description thereof is omitted. A display control unit 1000 displays a determination result of a determination unit 304 on a display 208 of the information processing apparatus 101.

Flowchart of Display Processing

Figure 11:
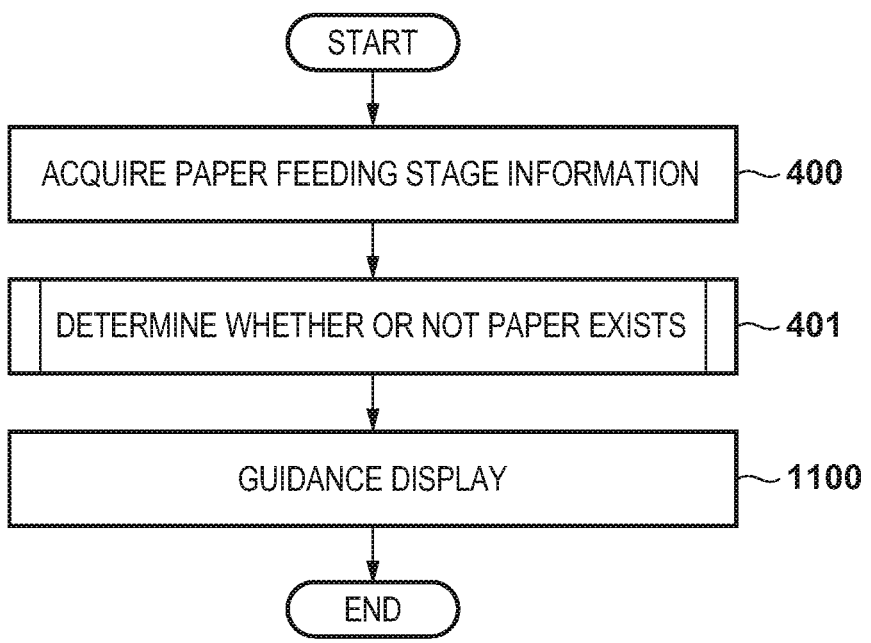
FIG. 11 is a flowchart of an entire processing according to the second embodiment.

FIG. 11 is a flowchart showing a flow of processing for selecting an image forming apparatus of this embodiment. Processing in FIG. 11 is executed as processing 804 in FIG. 8 similar to FIG. 4. Steps S400 and S401 are the same as the first embodiment, and thus, a description thereof is omitted. In step S1100, the display control unit 1000 displays a determination result in step S401 on the display 208. In the first embodiment, an image forming apparatus and a paper feeding stage are selected according to presence or absence of paper required for a printing job of interest and the remaining amount, but, in this embodiment, in step S1100, the states of image forming apparatuses connected to the information processing apparatus 101 are displayed on a user interface. The user references the states of the displayed image forming apparatuses, selects one image forming apparatus, and inputs information indicating that the image forming apparatus has been selected. An example of the user interface display will be described later.

The above-described steps make it possible for the information processing system of this embodiment to assist the operator so as to reduce the frequency of paper replacement.

Examples of Printing Job Transmission Destination Selection Screens

FIGS. 12A to 12F show six examples of printing job transmission destination selection screens that are displayed in step S1100. In FIGS. 12A to 12F, screens 1200, 1210, 1220, 1230, 1240, and 1250 are embodiments of printing job transmission destination selection screens. If the user interface of one of the screens is displayed, when selecting an image forming apparatus, the operator knows which image forming apparatus to select from a plurality of image forming apparatuses in order to prevent paper replacement. Alternatively, the operator can recognize that paper replacement occurs in the case of selecting an image forming apparatus in which a printing job is desired to be processed, before executing printing. Note that the paper replacement mentioned here includes paper replenishment.

In the screen 1200, in rows 1201 provided for respective image forming apparatuses, the display control unit 1000 reverses the display color of the image forming apparatuses according to whether or not paper replacement occurs, such that the operator recognizes whether or not paper replacement will occur. A name field 1202 is a display name of an image forming apparatus. A status field 1203 indicates the operation status of an image forming apparatus. For example, the screen 1200 indicates that the image forming apparatus displayed with a white background in the first row does not require paper replacement even if a printing job of interest is executed. On the other hand, it is indicated that image forming apparatuses in rows displayed in a shaded manner require paper replacement when a printing job of interest is executed. The paper replacement includes paper replacement at any timing, such as prior to execution of a printing job of interest or during execution of a printing job of interest.

In the screen 1210, as in a row 1211, only an image forming apparatus in which paper replacement does not occur is displayed, and image forming apparatuses in which paper replacement will occur are hidden. If there are a plurality of image forming apparatuses in which paper replacement will not occur, such image forming apparatuses are all displayed.

In the screen 1220, as in paper replacement display fields 1221, a determination result regarding whether or not paper replacement will occur is displayed for each image forming apparatus. As a display method, both an icon and text may be displayed as in the paper replacement display field 1221, only an icon may be displayed as in a paper replacement display field 1231 of the screen 1230, or only a text may be displayed as in a paper replacement display field 1241 of the screen 1240.

The screen 1250 indicates which cassette of each image forming apparatus has paper that is to be used, as in a paper feeding stage field 1251, in addition to display contents of the screen 1230.

The operator references the user interface screens in FIGS. 12A to 12F, makes a determination regarding an image forming apparatus, and selects the determined image forming apparatus. For example, it is possible to select an image forming apparatus that is to be a transmission destination of a printing job of interest by pressing an OK button in a state in which the row of the image forming apparatus to be selected is selected on the user interface screen.

As described above, according to this embodiment, candidate image forming apparatuses are displayed on a user interface screen such that the user can make a selection. The user can select an image forming apparatus with which labor for paper replacement is small, from the candidates.

Note that the remaining amount of paper that is to be used for a printing job of interest may further be added as an item that is displayed. Furthermore, the item may be displayed such that it is possible to identify whether or not the remaining amount satisfies the amount of paper necessary for a printing job of interest.

Third Embodiment

In the first and second embodiments, a mode has been described in which a printing job is transmitted from one information processing apparatus to image forming apparatuses. On the other hand, there are cases in which an image forming apparatus accepts printing jobs from a plurality of information processing apparatuses. Those cases include a case in which a plurality of operators of respective information processing apparatuses print a document using a printer driver, for example. In this case, in addition to paper feeding stage information of an image forming apparatus, the paper consumption amounts for printing jobs that are being processed or are to be processed by the image forming apparatus need to be taken into consideration during the procedure of determining whether or not there is paper. In view of this, in a third embodiment, an embodiment of the present invention in the case in which a plurality of information processing apparatuses transmit printing jobs to image forming apparatuses will be described. This makes it possible to make a determination on an image forming apparatus in which paper replacement will not occur, even in the above-described case. Note that, in this embodiment, a description of the same contents as those in the first embodiment and the second embodiment is omitted or simplified, and differences from these embodiments will be mainly described.

Configuration Example of Information Processing System

Figure 13:
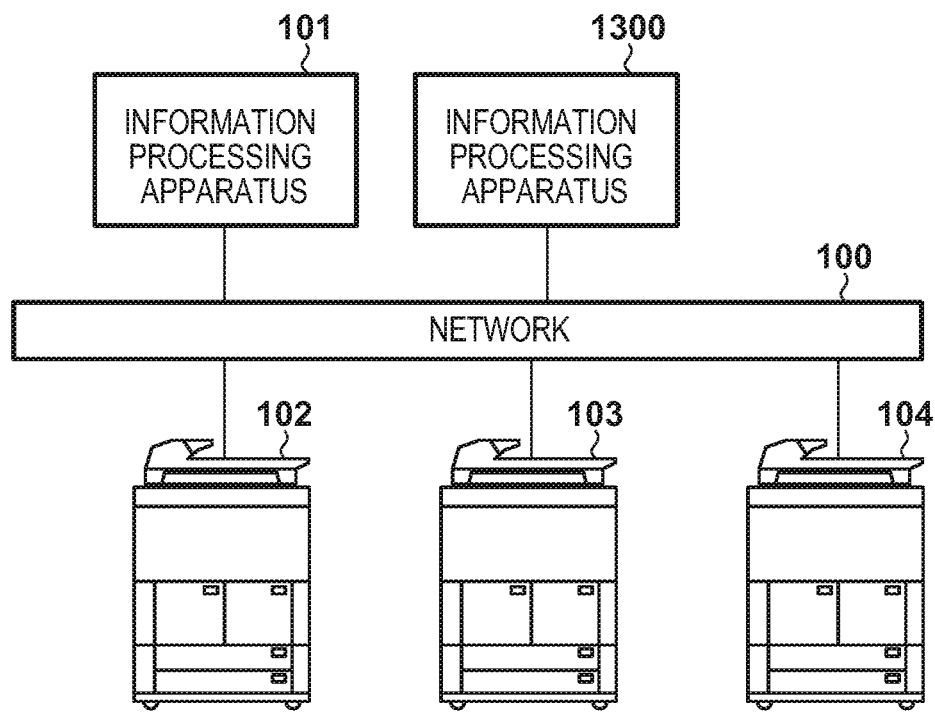
FIG. 13 is a diagram of the system configuration of an information processing system according to a third embodiment.

FIG. 13 is a diagram showing a configuration example of an information processing system in this embodiment. In FIG. 13, a network 100, an information processing apparatus 101, and image forming apparatuses 102 to 104 are the same as those in the configuration example of the information processing system of the first embodiment, and thus, a description thereof is omitted. In FIG. 13, an information processing apparatus 1300 transmits a printing job to the image forming apparatuses 102 to 104 similar to the information processing apparatus 101. The hardware configuration of the information processing apparatus 1300 and programs installed therein are the same as those of the information processing apparatus 101, and programs, such as a job management program for managing manufacturing of printed articles and a Web server, run on the information processing apparatus 1300. In addition, a printer driver program for connecting to the image forming apparatuses 102 to 104 through the network 100, and controlling the image forming apparatuses 102 to 104, and the like, are installed on the information processing apparatus 1300.

Software Configuration of Information Processing Apparatus

Figure 14:
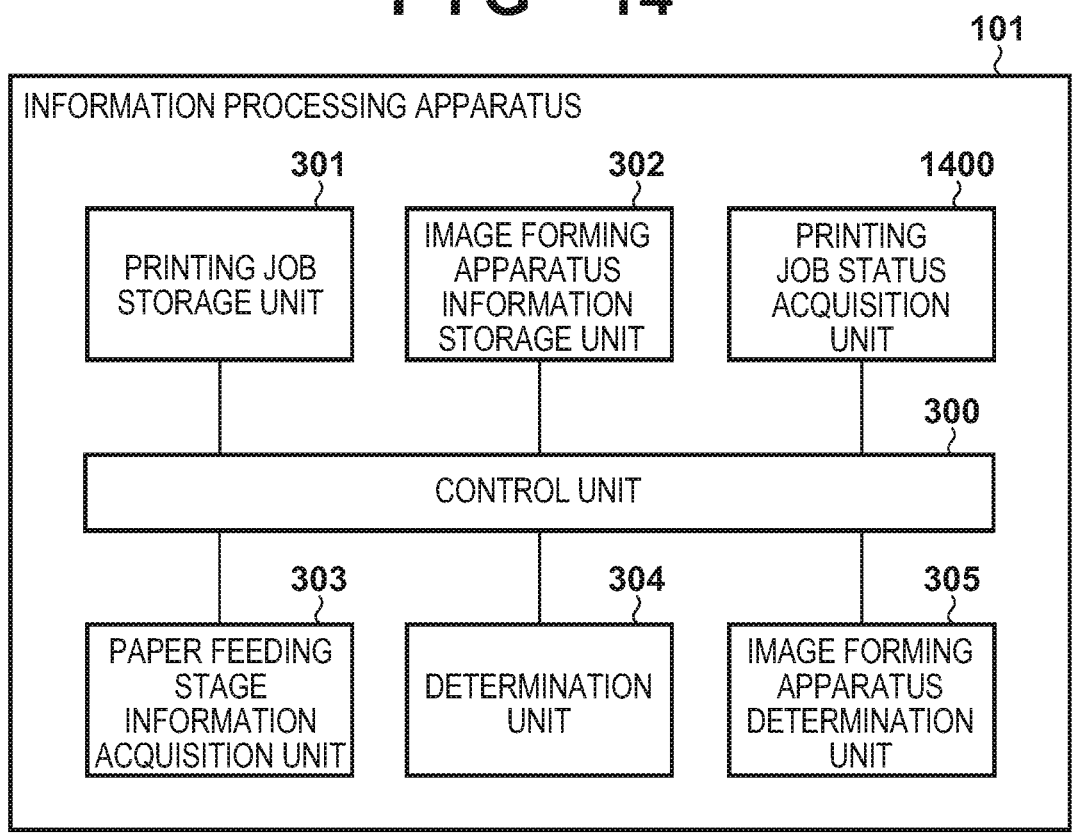
FIG. 14 is a block diagram showing the software configuration of an information processing apparatus according to the third embodiment.

FIG. 14 is a block diagram showing functions of the information processing apparatus 101 of this embodiment. Reference numerals 300 to 305 are the same as those in the first embodiment, and thus, a description thereof is omitted. A printing job status acquisition unit 1400 makes an inquiry regarding the processing status of a printing job to the image forming apparatuses registered in an image forming apparatus information storage unit 302, and accepts a response to the inquiry from the image forming apparatuses.

Figure 19:
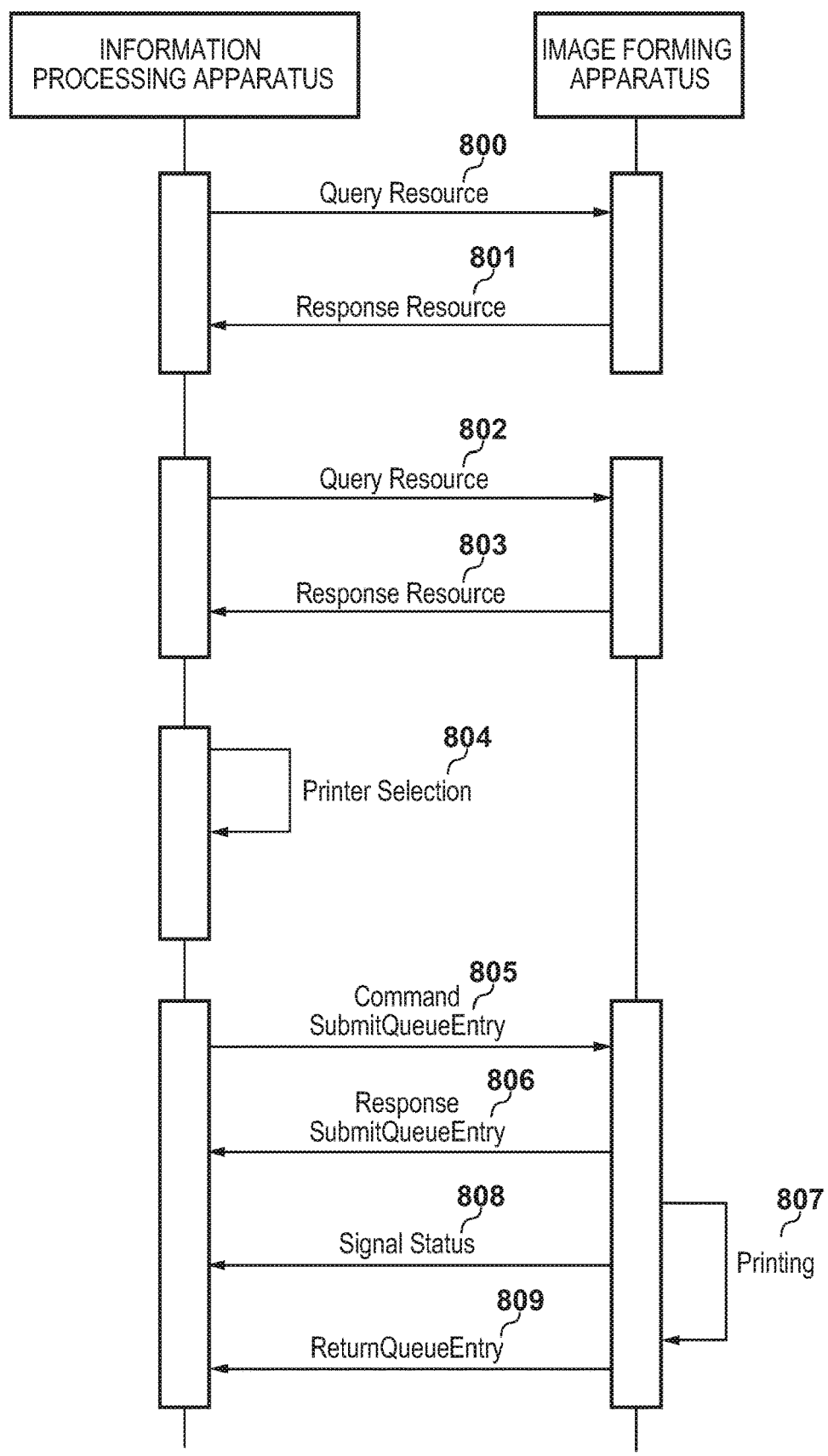
FIG. 19 is a diagram of a sequence between the information processing apparatus and an image forming apparatus according to the third embodiment.

FIG. 19 is a diagram showing a sequence of message exchange and processing between an information processing apparatus and an image forming apparatus in this embodiment. The difference from FIG. 8 is that an inquiry 802 and a response 803 to the inquiry 802 are made. The printing job status acquisition unit 1400 makes an inquiry regarding a printing job status (the inquiry 802) to the image forming apparatuses 102 to 104. Next, in the response 803, the image forming apparatuses 102 to 104 that received the inquiry return a printing job status as a response to the information processing apparatus 101.

Example of Printing Job Status

FIG. 16 shows an example of a printing job status acquired from an image forming apparatus in this embodiment. In this embodiment, the printing job status is expressed using JMF similar to the above-mentioned paper feeding tray information.

In FIG. 16, a printing job status 1600 is an example of a printing job status acquired by the information processing apparatus 101 from an image forming apparatus. One JobPhase element indicates one printing job. There are three JobPhase elements (1601 to 1603) in the printing job status 1600, and thus it is indicated that the image forming apparatus that transmitted the printing job status 1600 has three printing jobs.

Statuses of a printing job in an image forming apparatus include an identification (ID) indicating a printing job (JobID), a progress status of processing (Status), a progress rate of processing (PercentCompleted), the total number of sheets that are to be consumed for the printing job (TotalAmount), and the number of sheets that have been consumed for the printing job so far (Amount). Note that the value of "Status" of the JobPhase element 1601 is "InProgress", and thus, it is understood that the printing job corresponding to the JobPhase element 1601 is currently being processed by an image forming apparatus. In addition, the value of "Status" of the JobPhase elements 1602 and 1603 is "Ready", and thus, it is understood that the printing jobs corresponding to the JobPhase elements 1602 and 1603 are currently in a stand-by state in an image forming apparatus. In this manner, it is possible to recognize, from the printing job status, a printing job that is being executed by an image forming apparatus or is in a stand-by state and the amount of paper (the number of sheets) that is to be consumed.

Flowchart of Entire Processing in this Embodiment

Figure 15:
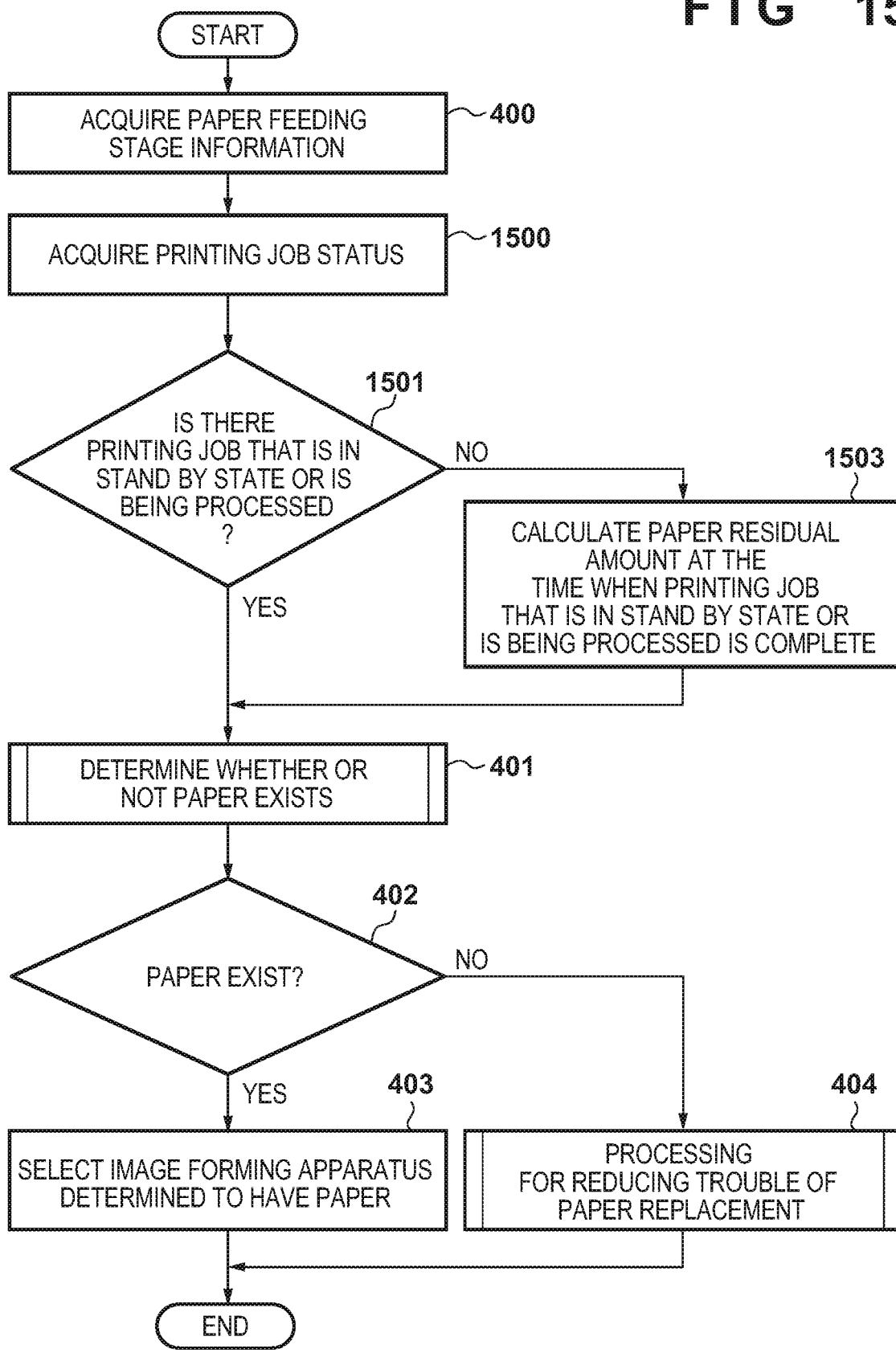
FIG. 15 is a flowchart of an entire processing according to the third embodiment.

FIG. 15 is a flowchart of an entire processing in the third embodiment. Steps S400 to 404 in FIG. 15 are the same as steps in the first embodiment, and thus, a description thereof is omitted.

In step S1500, the printing job status acquisition unit 1400 makes an inquiry regarding the processing status of a printing job to image forming apparatuses registered in the image forming apparatus information storage unit 302, and accepts printing job statuses in response to the inquiry from the image forming apparatuses. Step S1500 corresponds to the inquiry 802 and the response 803 in FIG. 19.

In step S1501, the determination unit 304 determines, based on the printing job statuses acquired in step S1500, whether or not there is a printing job that is in a stand-by state or is being processed in an image forming apparatus (in other words, the presence or absence of a printing job that is in a stand-by state or being executed). If there is no printing job, the determination unit 304 advances the procedure to step S401, and, if there are one or more printing jobs, advances the procedure to step S1503. In step S1503, the determination unit 304 calculates the paper remaining amount in a paper feeding stage at the time when the printing job that is in a stand-by state or is being processed is complete.

Specifically, for example, a value acquired by subtracting the amount of paper that is estimated to be consumed for a printing job that is being executed by an image forming apparatus of interest or is in a stand-by state, from the paper remaining amount of each paper feeding stage of the image forming apparatus of interest is stored as a paper remaining amount immediately before execution of the printing job of interest, for example. Regarding a printing job that is being executed, a value acquired by subtracting the amount of paper that has been printed already from the amount of paper that is to be consumed is calculated as the amount of paper that is estimated to be consumed. As a manner of course, a paper remaining amount is calculated with respect to the same type of paper, in other words paper having the same attribute. In addition, in a case in which the remaining amount is a negative number as a result of calculation, paper corresponding to the negative number is to be replenished, and thus, a unit of replenishment (e.g., 1000) is added to obtain a remaining amount. Furthermore, in a case in which paper having an attribute required for a printing job that is being executed or is in a stand-by state in an image forming apparatus of interest is not set in the image forming apparatus of interest, the current paper is to be replaced with necessary paper at the time of starting the printing job. In this embodiment, a paper feeding stage in which the remaining amount is small (desirably, the smallest) is selected as a paper feeding stage in which paper is to be replaced, and thus, the remaining amount is calculated assuming that paper in a paper feeding stage in which the paper remaining amount is small has been replaced with paper necessary for the printing job. At the time of replacement, a calculation may be performed assuming that paper that is newly replenished by replacement is replenished in units of replenishment (e.g., 1000), for example. The remaining amount is then calculated by subtracting the amount of paper that is consumed for a printing job from this amount of paper that has been replenished.

Subsequently, if step S1503 has been executed, the presence or absence of paper is determined in step S401 based on the paper remaining amount of each paper feeding stage of the image forming apparatuses calculated in step S1503. Steps from step S402 are similar to those in FIG. 4.

As described above, according to this embodiment, an image forming apparatus that is a transmission destination of a printing job of interest can be selected in consideration of not only the current paper remaining amounts of image forming apparatuses, but also the amount of paper that is consumed in a prior printing job executed in the same image forming apparatus before the printing job of interest. Accordingly, labor for paper replacement can be reduced more reliably.

Fourth Embodiment

In the third embodiment, a mode has been described in which an image forming apparatus in which paper replacement will not occur when executing a printing job is automatically determined based on paper information of the printing job, paper feeding stage information of image forming apparatuses, and the printing job statuses in the image forming apparatuses. On the other hand, similar to the case of the second embodiment, there are also cases in which the operator manually selects an image forming apparatus in which processing of a printing job is desired to be performed. In view of this, in a fourth embodiment, a mode will be described in which the operator manually selects an image forming apparatus. This makes it possible for the operator to select an image forming apparatus in which paper replacement will not occur, even in the above-described case. Note that description of the same contents as those in the first to third embodiments is omitted or simplified, and differences from the first to third embodiments will be mainly described in this embodiment.

Software Configuration of Information Processing Apparatus

FIG. 17 is a block diagram showing functions of an information processing apparatus 101 of this embodiment. Functional blocks 300 to 304 and 1000 in FIG. 17 are the same as those in FIG. 10 described above, and thus, a description thereof is omitted. In addition, a printing job status acquisition unit 1400 is the same such as that in FIG. 14, and thus, a description thereof is omitted.

Flowchart of Entire Processing in this Embodiment

Figure 18:
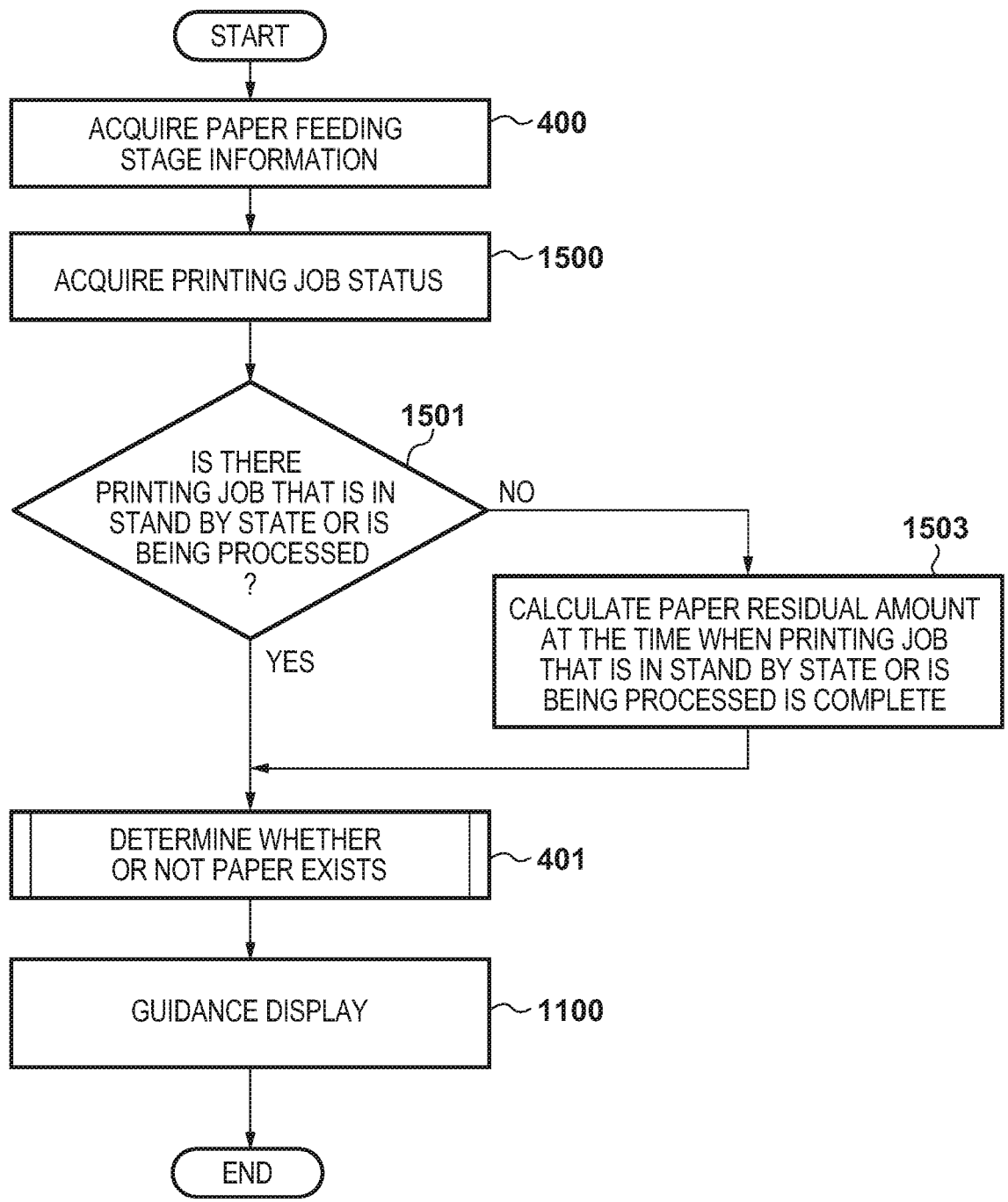
FIG. 18 is a flowchart of an entire processing according to the fourth embodiment.

FIG. 18 is a flowchart of an entire processing in the fourth embodiment. Each of steps S400, S401, S1100, S1500, S1501, and S1502 in FIG. 18 is the same as a corresponding step in one of the above embodiments, and thus, a description thereof is omitted. Specifically, in this embodiment, when obtaining a paper remaining amount for each image forming apparatus or each paper feeding stage, a paper remaining amount is acquired by subtracting the amount of paper that is consumed for a printing job that is being executed by an image forming apparatus or is in a stand-by state, as in the third embodiment. Whether or not there is paper necessary for the printing job of interest is displayed for each image forming apparatus based on the remaining amount, as in the second embodiment. A display example may be a user interface, such as those in FIGS. 12A to 12F, similar to the second embodiment. The operator determines, on the user interface, an image forming apparatus to be a transmission destination of the printing job of interest.

In this manner, according to the embodiment, it is possible to display image forming apparatuses that are candidate transmission destinations of the printing job of interest, and to select an image forming apparatus, in consideration of not only the current paper remaining amount of an image forming apparatus but also the amount of paper that is consumed for a printing job that is to be executed in the image forming apparatus before a printing job of interest. Accordingly, it is possible to more reliably reduce labor for paper replacement.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus connected to at least one image forming apparatus for executing a printing job, the information processing apparatus comprising:
   (A) at least one memory that stores a program; and
   (B) at least one processor that executes the program that causes the information processing apparatus to:
   acquire a state of a plurality of paper feeding stages from an image forming apparatus, of the at least one image forming apparatus;
   determine, based on a state of a paper feeding stage of the image forming apparatus, whether or not an amount of sheets to be consumed by a printing job is set on the paper feeding stage of the image forming apparatus;
   in a case where it is determined that the amount of sheets to be consumed by the printing job is set on the paper feeding stage, transmit a print job including identification information of the paper feeding stage determined to have the amount of sheets set thereon to the image forming apparatus;
   in a case where it is determined that the amount of sheets to be consumed by the printing job is not set on any paper feeding stage of the image forming apparatus, determine, based on the state of the plurality of paper feeding stages, whether or not the amount of sheets to be consumed by the printing job is equal to or less than a total amount of sheets set in the plurality of paper feeding stages of the image forming apparatus; and
   in a case where it is determined that the amount of sheets to be consumed by the printing job is equal to or less than a total amount of sheets set in the plurality of paper feeding stages of the image forming apparatus, transmit a print job including identification information of each of the plurality of paper feeding stages that is determined to the image forming apparatus.

2. The information processing apparatus according to claim 1, wherein in a case where a preceding printing job prior to the printing job exists, it is determined whether or not the amount of sheets to be consumed by the printing job remains on the paper feeding stage of the image forming apparatus after sheets were consumed for the preceding printing job prior to the printing job.

3. The information processing apparatus according to claim 1, wherein, if it is determined that no image forming apparatus has the amount of sheets to be consumed for the printing job, an image forming apparatus in which a remaining amount of sheets, which are the same type of sheets as those of the printing job, is large is selected as a transmission destination of the printing job.

4. The information processing apparatus according to claim 1, wherein, in a case where it is determined that there is no paper feeding stage in which sheets, which are the same type of sheets as those of the printing job, are stored, an image forming apparatus, of the at least one image forming apparatus, having a paper feeding stage in which a paper remaining amount is small is selected as a transmission destination of the printing job.

5. The information processing apparatus according to claim 1, wherein, in a case in which a sheet replacement occurred for a last printing job executed in the image forming apparatus, it is determined whether or not a sheet placed in the sheet feeding stage during the replacement is the same type of sheet as a sheet that is to be used for the printing job, and, in a case in which it is determined that those sheets are the same type of sheet, the image forming apparatus is selected as a transmission destination of the printing job.

6. The information processing apparatus according to claim 1, wherein the information processing apparatus is configured to connect to a plurality of image forming apparatuses, and
   wherein the state of the plurality of the paper feeding stages is acquired and then it is determined whether or not the image forming apparatus has an amount of sheets that are to be consumed for a printing job, respectively, for the plurality of image forming apparatuses.

7. The information processing apparatus according to claim 1, wherein the processor further causes the information processing apparatus to display whether or not the image forming apparatus has the amount of sheets that are to be used for the printing job, based on a state of each paper feeding stage of the image forming apparatus acquired, and determine an image forming apparatus selected from the displayed image forming apparatus to be a transmission destination of the printing job.

8. The information processing apparatus according to claim 1, wherein the print job further includes information regarding automatic switching of the paper feeding stage in a case where the print job including the information regarding the plurality of paper feeding stages is transmitted to the image forming apparatus.

9. An image forming apparatus determination method that is performed by an information processing apparatus connected to at least one image forming apparatus for executing a printing job, the method comprising:
   acquiring a state of a plurality of paper feeding stages from an image forming apparatus, of the at least one image forming apparatus;
   determining, based on a state of a paper feeding stage of the image forming apparatus, whether or not an amount of sheets to be consumed by a printing job is set on the paper feeding stage of the image forming apparatus;
   transmitting, in a case where it is determined that the amount of sheets to be consumed by the printing job is set on the paper feeding stage, a print job including identification information of the paper feeding stage determined to have the amount of sheets set thereon to the image forming apparatus;
   determining, in a case where it is determined that the amount of sheets to be consumed by the printing job is not set on any paper feeding stage of the image forming apparatus, based on the state of the plurality of paper feeding stages, whether or not the amount of sheets to be consumed by the printing job is equal to or less than a total amount of sheets set in the plurality of paper feeding stages of the image forming apparatus; and
   transmitting, in a case where it is determined that the amount of sheets to be consumed by the printing job is equal to or less than a total amount of sheets set in the plurality of paper feeding stages of the image forming apparatus, a print job including identification information of each of the plurality of paper feeding stages that is determined to the image forming apparatus.

10. The image forming apparatus determination method according to claim 9, wherein the transmitting transmits the print job further including information regarding automatic switching of the paper feeding stage in a case where the transmitting transmits the print job including the information regarding the plurality of paper feeding stages.

11. A non-transitory computer-readable storage medium that stores a program that, when executed by a computer connected to at least one image forming apparatus for executing a printing job, causes the computer to perform operations of:
   acquiring a state of a plurality of paper feeding stages from an image forming apparatus, of the at least one image forming apparatus;
   determining, based on a state of a paper feeding stage of the image forming apparatus, whether or not an amount of sheets to be consumed by a printing job is set on the paper feeding stage of the image forming apparatus;
   transmitting, in a case where it is determined that the amount of sheets to be consumed by the printing job is set on the paper feeding stage, a print job including identification information of the paper feeding stage determined to have the amount of sheets set thereon to the image forming apparatus;
   determining, in a case where it is determined that the amount of sheets to be consumed by the printing job is not set on any paper feeding stage of the image forming apparatus, based on the state of the plurality of paper feeding stages, whether or not the amount of sheets to be consumed by the printing job is equal to or less than a total amount of sheets set in the plurality of paper feeding stages of the image forming apparatus; and
   transmitting, in a case where it is determined that the amount of sheets to be consumed by the printing job is equal to or less than a total amount of sheets set in the plurality of paper feeding stages of the image forming apparatus, a print job including identification information of each of the plurality of paper feeding stages that is determined to the image forming apparatus.

12. The non-transitory computer-readable storage medium according to claim 11, wherein the transmitting transmits the print job further including information regarding automatic switching of the paper feeding stage in a case where the transmitting transmits the print job including the information regarding the plurality of paper feeding stages.

* * * * *